US006498833B2

United States Patent
Sugino et al.

(10) Patent No.: US 6,498,833 B2
(45) Date of Patent: Dec. 24, 2002

(54) CHANNEL CHECK TEST SYSTEM

(75) Inventors: Yukimasa Sugino, Tokyo (JP); Shigeaki Suzuki, Tokyo (JP); Nobuyoshi Horie, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/922,858

(22) Filed: Aug. 7, 2001

(65) Prior Publication Data

US 2001/0056556 A1 Dec. 27, 2001

Related U.S. Application Data

(62) Division of application No. 09/634,765, filed on Aug. 7, 2000, now Pat. No. 6,324,260.

(30) Foreign Application Priority Data

Dec. 7, 1998 (JP) ............................................ 10-347103
Dec. 2, 1999 (JP) ................................... PCT/JP99/06771

(51) Int. Cl.[7] ......................... H04M 1/24; G01R 31/08; G08C 15/00
(52) U.S. Cl. ............... 379/1.01; 379/22.02; 379/27.01; 379/28; 370/242; 370/247; 370/250
(58) Field of Search ............................. 379/1.01, 10.01, 379/12, 16, 18, 22, 22.02, 27.01, 28, 29.01, 29.11, 31, 32.01, 1.03, 24, 26, 23; 370/241, 242, 247, 248, 251, 252, 282, 464, 494; 375/219, 220, 222, 241, 242

(56) References Cited

U.S. PATENT DOCUMENTS

| | | |
|---|---|---|
| 4,608,683 A | 8/1986 | Shigaki |
| 5,159,638 A | 10/1992 | Naito et al. |
| 5,295,223 A | 3/1994 | Saito |
| 5,694,517 A | 12/1997 | Sugino et al. |
| 5,995,539 A * | 11/1999 | Miler .......................... 375/222 |
| 6,057,882 A * | 5/2000 | Van Den Branden Lambrecht et al. ............................... 348/192 |
| 6,163,882 A * | 12/2000 | Lee et al. ..................... 341/143 |

FOREIGN PATENT DOCUMENTS

| | | |
|---|---|---|
| JP | A5846396 | 3/1983 |
| JP | A63268325 | 11/1988 |

* cited by examiner

Primary Examiner—Binh Tieu
(74) Attorney, Agent, or Firm—Birch, Stewart, Kolasch & Birch, LLP

(57) ABSTRACT

When there is an error in setting of a companding law of an encoder or a decoder, there is a problem of an error in judgment although it should be originally judged that the continuity of the testing channel does not exist.

Therefore, a channel check test system includes a transmitting side DCME for inserting a nonlinear quantized input test pattern into a channel to be tested, and a receiving side DCME. The receiving side DCME includes an adder for adding an offset value to an output value of a linear converting section, a sign extracting section for extracting a sign from an output signal of the adder, a delay unit for delaying the extracted sign, an exclusive OR arithmetic unit for performing an exclusive OR operation of the extracted sign and an output signal of the delay unit, a counter for counting the number of times of conformity in which an output value of the exclusive OR arithmetic unit is in conformity with a predetermined value, and a comparator for comparing a counted value of the counter and a threshold value and outputting judged results.

Existence or nonexistence of the continuity of the channel to be tested can be checked including an error in setting of the PCM companding law in one of the transmitting side DCME and the receiving side DCME.

18 Claims, 17 Drawing Sheets

FIG. 2A DATA NUMBER

FIG. 2B OUTPUT VALUE OF LINEAR CONVERTING SECTION 19

FIG. 2C OUTPUT VALUE OF ADDER 21

FIG. 2D OUTPUT OF SIGN EXTRACTING SECTION 22

FIG. 2E OUTPUT OF DELAY UNIT 23

FIG. 2F OUTPUT OF EXCLUSIVE OR ARITHMETIC UNIT 24

FIG. 3A  DATA NUMBER

| 0 | 1 | 2 | 3 | 4 | 5 | 6 | 7 | 8 | 9 | 10 | 11 | 12 | 13 | 14 | 15 |

FIG. 3B  OUTPUT VALUE OF LINEAR CONVERTING SECTION 19 — 131 / 130

FIG. 3C  OUTPUT VALUE OF ADDER 21 — 132

FIG. 3D  OUTPUT OF SIGN EXTRACTING SECTION 22 — 133

| 1 | 1 | 0 | 0 | 0 | 0 | 0 | 1 | 1 | 0 | 0 | 0 | 0 | 0 | 0 | 0 |

FIG. 3E  OUTPUT OF DELAY UNIT 23 — 134

| 0 | 0 | 0 | 0 | 0 | 0 | 0 | 0 | 1 | 1 | 0 | 0 | 0 | 0 | 0 | 0 |

FIG. 3F  OUTPUT OF EXCLUSIVE OR ARITHMETIC UNIT 24 — 135

| 1 | 1 | 0 | 0 | 0 | 0 | 0 | 1 | 0 | 1 | 0 | 0 | 0 | 0 | 0 | 0 |

FIG. 14A  DATA NUMBER: 0 1 2 3 4 5 6 7 8 9 10 11 12 13 14 15 16 17 18 19 20

FIG. 14B  WAVEFORM OF DIGITAL TONE SIGNAL (110, 111)

FIG. 14C  SIGN BIT OF DIGITAL TONE SIGNAL: 0 0 1 1 1 1 1 1 1 1 1 0 0 0 0 0 0 0 0 0 0 (112)

FIG. 14D  SIGN BIT DELAYED BY HALF PERIOD: 1 1 0 0 0 0 0 0 0 0 0 1 1 1 1 1 1 1 1 1 1 (113)

FIG. 14E  EXCLUSIVE OR: 1 1 1 1 1 1 1 1 1 1 1 1 1 1 1 1 1 1 1 1 1 (114)

FIG. 16

| SAMPLE NUMBER | bit1 (SIGN) | bit2 | bit3 | bit4 | bit5 | bit6 | bit7 | bit8 |
|---|---|---|---|---|---|---|---|---|
| 1 | 1 | 0 | 1 | 0 | 0 | 1 | 1 | 1 |
| 2 | 1 | 0 | 0 | 0 | 1 | 1 | 1 | 0 |
| 3 | 1 | 0 | 0 | 0 | 0 | 1 | 0 | 1 |
| 4 | 1 | 0 | 0 | 0 | 0 | 0 | 0 | 1 |
| 5 | 1 | 0 | 0 | 0 | 0 | 0 | 0 | 1 |
| 6 | 1 | 0 | 0 | 0 | 0 | 1 | 0 | 1 |
| 7 | 1 | 0 | 0 | 0 | 1 | 1 | 1 | 0 |
| 8 | 1 | 0 | 1 | 0 | 0 | 1 | 1 | 1 |
| 9 | 0 | 0 | 1 | 0 | 0 | 1 | 1 | 1 |
| 10 | 0 | 0 | 0 | 0 | 1 | 1 | 1 | 0 |
| 11 | 0 | 0 | 0 | 0 | 0 | 1 | 0 | 1 |
| 12 | 0 | 0 | 0 | 0 | 0 | 0 | 0 | 1 |
| 13 | 0 | 0 | 0 | 0 | 0 | 0 | 0 | 1 |
| 14 | 0 | 0 | 0 | 0 | 0 | 1 | 0 | 1 |
| 15 | 0 | 0 | 0 | 0 | 1 | 1 | 1 | 0 |
| 16 | 0 | 0 | 1 | 0 | 0 | 1 | 1 | 1 |

FIG. 17

| SAMPLE NUMBER | bit1 (SIGN) | bit2 | bit3 | bit4 | bit5 | bit6 | bit7 | bit8 |
|---|---|---|---|---|---|---|---|---|
| 1 | 1 | 0 | 0 | 0 | 1 | 1 | 0 | 1 |
| 2 | 1 | 0 | 1 | 0 | 0 | 1 | 0 | 0 |
| 3 | 1 | 0 | 1 | 0 | 1 | 1 | 0 | 0 |
| 4 | 1 | 0 | 1 | 0 | 1 | 0 | 1 | 1 |
| 5 | 1 | 0 | −1 | 0 | 1 | 0 | 1 | 1 |
| 6 | 1 | 0 | 1 | 0 | 1 | 1 | 0 | 0 |
| 7 | 1 | 0 | 1 | 0 | 0 | 1 | 0 | 0 |
| 8 | 1 | 0 | 0 | 0 | 1 | 1 | 0 | 1 |
| 9 | 0 | 0 | 0 | 0 | 1 | 1 | 0 | 1 |
| 10 | 0 | 0 | 1 | 0 | 0 | 1 | 0 | 0 |
| 11 | 0 | 0 | 1 | 0 | 1 | 1 | 0 | 0 |
| 12 | 0 | 0 | 1 | 0 | 1 | 0 | 1 | 1 |
| 13 | 0 | 0 | 1 | 0 | 1 | 0 | 1 | 1 |
| 14 | 0 | 0 | 1 | 0 | 1 | 1 | 0 | 0 |
| 15 | 0 | 0 | 1 | 0 | 0 | 1 | 0 | 0 |
| 16 | 0 | 0 | 0 | 0 | 1 | 1 | 0 | 1 |

CHANNEL CHECK TEST SYSTEM

CROSS REFERENCE TO RELATED APPLICATION

This application is a divisional of Application No. 09/634,765, filed on Aug. 7, 2000 now U.S. Pat. No. 6,324,260 and for which priority is claimed under 35 U.S.C. §120. Application Ser. No. 09/634,765 is the national phase of PCT International Application No. PCT/JP99/06771 filed on Dec. 2, 1999 under 35 U.S.C. §371. The entire contents of each of the above-identified applications are hereby incorporated by reference. This application also claims priority of Application No. 10-347103 filed in Japan on Dec. 7, 1998 under 35 U.S.C. §119.

This is a continuation of International Application PCT/JP99/06771, with an international filing date of Dec. 2, 1999.

TECHNICAL FIELD

The present invention relates to a channel check test system for checking the continuity of a channel in digital circuit multiplication equipment (hereinafter called "DCME").

BACKGROUND ART

The DCME is known as an equipment for transmitting a voice signal over a telephone communication line with high efficiency using low rate encoding technique and a digital speech interpolation technique. In this DCME, a channel check test for checking existence or nonexistence of the continuity of a transmission channel is made.

A conventional channel check test system will be explained with reference to the drawings. FIG. 12 is a diagram showing the structure of the conventional channel check test system.

In FIG. 12, reference numerals 1 and 2 respectively designate a transmitting side DCME and a receiving side DCME. Reference numeral 3 designates an input signal nonlinear-quantized by an A-law or a μ-law and inputted to the transmitting side DCME 1. An input pattern generator 4 generates an input test pattern nonlinear-quantized by the A-law or the μ-law. An A-law input pattern data memory 4a stores input test pattern data nonlinear-quantized by the A-law. A μ-law input pattern data memory 4b accumulates input test pattern data nonlinear-quantized by the μ-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, a decoder 7 decodes the encoded signal. Reference numerals 8a and 8b respectively designate a decoded signal nonlinear-quantized by the A-law or the μ-law and outputted from the decoder 7, and an output signal nonlinear-quantized by the A-law or the μ-law from the receiving side DCME 2. An output pattern generator 9 generates an output test pattern nonlinear-quantized by the A-law or the μ-law. An A-law output pattern data memory 9a stores output test pattern data nonlinear-quantized by the A-law. A μ-law output pattern data memory 9b stores output test pattern data nonlinear-quantized by the μ-law. Reference numeral 9c designates a selector. A comparator 10 compares the decoded signal 8a and the output test pattern. A counter 11 counts the number of conformity bits of the output test pattern and the decoded signal 8a. A judging circuit 12 judges existence or nonexistence of the continuity of a channel on the basis of an output of the counter 11. Reference numeral 13 designates judged results. Reference numerals 14a, 14b, 14c and 14d designate companding law setting signals.

An operation of the above-mentioned conventional channel check test system will next be explained with reference to the drawings.

The operation of the conventional channel check test system with respect to an operated channel which is not being tested, i.e., a channel for transmitting a voice talking signal will first be explained.

An input signal 3 inputted to the transmitting side DCME 1 is provided to the encoder 6 without inserting the input test pattern into this signal in the test pattern insertion circuit 5 and is encoded with high efficiency. Output data of the encoder 6 are outputted to the receiving side DCME 2.

The input signal 3 is a PCM signal nonlinear-quantized by the A-law or the μ-law prescribed in ITU Recommendation G.711. When a companding law of the nonlinear quantization of the input signal 3 is the A-law, the companding law setting signal 14b is provided such that an operating mode of the encoder 6 is set to the A-law. In contrast to this, when the companding law of the input signal 3 is the μ-law, the companding law setting signal 14b is provided such that the operating mode of the encoder 6 is set to the μ-law.

In the receiving side DCME 2, the received output data of the encoder 6 are decoded in the decoder 7, and are outputted as an output signal 8b from the receiving side DCME 2. The output signal 8b from the receiving side DCME 2 is also a PCM signal nonlinear-quantized by the A-law or the μ-law. The companding law setting signal 14c is provided, and an operating mode of the decoder 7 is set such that the output signal 8b from the receiving side DCME 2 is set to a predetermined companding law (the A-law or the μ-law).

The operation of the conventional channel check test system with respect to the channel which is being tested will next be explained.

The input pattern generator 4 generates an input test pattern for checking the channel. The test pattern insertion circuit 5 outputs this input test pattern instead of the input signal 3 inputted to the transmitting side DCME 1 to the encoder 6. The encoder 6 encodes the input test pattern with high efficiency, and output data of the encoder 6 are outputted to the receiving side DCME 2.

It is necessary to set the companding law of the input test pattern outputted from the input pattern generator 4 in conformity with the companding law of the encoder 6. Therefore, one of output data of the A-law input pattern data memory 4a and output data of the μ-law input pattern data memory 4b is selected in the selector 4c in accordance with a companding law setting signal 14a and is made to be an output signal of the input pattern generator 4.

In the receiving side DCME 2, the received output data of the encoder 6 are decoded in the decoder 7. Each bit of a decoded signal 8a outputted from this decoder 7 is compared with the corresponding bit of an output signal of the output pattern generator 9 in the comparator 10. Output data of the output pattern generator 9 should be an expected pattern of the decoded signal obtained by firstly encoding the output signal of the input pattern generator 4 and secondly re-decoding this encoded signal.

It is necessary to set the companding law of the output test pattern outputted from the output pattern generator 9 in conformity with the companding law of the decoder 7.

Therefore, one of output data of the A-law output pattern data memory 9a and the μ-law output pattern data memory 9b is selected in the selector 9c in accordance with a companding law setting signal 14d and is made to be an output signal of the output pattern generator 9.

Compared results of each bit outputted from the comparator 10 are inputted to the counter 11 and this counter 11 counts the number of nonconformity bits within a predetermined time. The counted number of nonconformity bits outputted from the counter 11 is inputted to the judging circuit 12. When the counted value exceeds a predetermined value, the judging circuit 12 judges that the continuity of the testing channel does not exist. In contrast to this, when the counted value does not exceed the predetermined value, the comparing circuit 12 judges that the continuity of the testing channel exists, and outputs results 13 of this judgment.

In the channel check test system constructed above, when plural coding systems (e.g., coding systems prescribed in ITU Recommendations G.726, G.728, G.729, etc.) are supported in the DCME, one of the solution for this case is to prepare an input test pattern and an output test pattern in accordance with the coding systems separately. However, when the input test pattern and the output test pattern are respectively prepared in accordance with the coding systems, a problem exists in that a circuit scale of the channel check test system is large-sized.

A system for checking continuity by using a tone signal as the input test pattern and monitoring a sign bit of an output of the decoder 7 within the receiving side DCME 2 is considered as a method able to be commonly used irrespective of the coding systems with a simple structure.

FIG. 13 is a diagram showing the structure of another conventional channel check test system shown in e.g. Japanese Patent Application Laid-Open No. 7-131832.

In FIG. 13, reference numerals 100, 101 and 102 respectively designate a frequency information detecting section, a sign bit and a delay circuit for delaying the sign bit 101 by a data amount for about a half period of an input digital tone signal. An exclusive OR circuit 103 inputs the sign bit 101 and the output of the delay circuit 102 thereto and calculates an exclusive OR. A nonconformity number integral period counter 104 determines the number of added data of an output of the exclusive OR circuit 103. A nonconformity number adding integrator 105 adds and integrates the output of the exclusive OR circuit 103 corresponding to the data amount determined by the nonconformity number integral period counter 104. A nonconformity number comparator 106 judges conformity or nonconformity with respect to a frequency of the input digital tone signal in accordance with an output of the nonconformity number adding integrator 105.

An operation of another conventional channel check test system will next be explained.

If the digital tone signal is a normal digital tone signal, the sign bit 101 continuously repeats "0" and "1" every half period. The frequency information detecting section 100 detects this continuous repetition of "0" and "1" as follows. Namely, the sign bit 101 is delayed by the half period in the delay circuit 102. The sign bit 101 and the output of the delay circuit 102 are inputted to the exclusive OR circuit 103. The exclusive OR circuit 103 calculates an exclusive OR of the sign bit 101 and the output of the delay circuit 102.

Thus, as shown by a numerical reference 114 of FIG. 14(e), all outputs of the exclusive OR circuit 13 show "1" when the digital tone signal is the normal digital tone signal.

The outputs of this exclusive OR circuit 103 are added to each other by a data number designated by the nonconformity number integral period counter 104 by using the nonconformity number adding integrator 105. An output of the nonconformity number adding integrator 105 corresponds to a degree of the continuous repetition of "0" and "1" every half period of the sign bit 101. Then, frequency is inspected by inspecting the output of the nonconformity number adding integrator 105 by the nonconformity number comparator 106.

Since another conventional channel check test system is constructed as mentioned above, the continuity of a channel can be checked by a simple structure by detecting the periodic repetition of the sign bit.

However, there are the following problems when another conventional channel check test system having the above structure of FIG. 13 is applied to the DCME.

FIG. 15 is a block diagram showing an example in which another conventional channel check test system having the structure of FIG. 13 is applied to the DCME.

In FIG. 15, an internal operation of the transmitting side DCME 1 is the same as the internal operation of the transmitting side DCME 1 explained in the structure of FIG. 12. In contrast to this, in the receiving side DCME 2, an output signal nonlinear-quantized by the A-law or the μ-law from the decoder 7 is provided to a sign extracting section 108 and a sign bit 101 is extracted. The sign bit 101 is inputted to the frequency information detecting section 100 and existence or nonexistence of the continuity of a channel is judged by detecting periodic repetition of the sign bit 101. A detailed operation of this frequency information detecting section 100 is equal to that explained in the structure of FIG. 13.

In FIG. 15, for example, an operation of the channel check test system will be considered when both a companding law of the input signal 3 to the transmitting side DCME 1 and a companding law of the output signal 8b from the receiving side DCME 2 are the μ-law. In this case, it is necessary to operate the encoder 6 within the transmitting side DCME 1 and the decoder 7 within the receiving side DCME 2 by the μ-law. However, it is here supposed that the decoder 7 is operated erroneously by the A-law by an error in the companding law setting signal 14c.

Assume that a series of signals as shown in a table of FIG. 16 is used as the input test pattern. The signal series shown in the table of FIG. 16 shows a tone signal having 500 Hz in frequency and 3 dBm0 in signal level (in the case of 8 kHz in sampling frequency).

Influences of the deterioration of a signal waveform on coding and decoding are neglected to simplify the explanation. If the channel check test system is set such that both the encoder 6 and the decoder 7 are correctly operated by the μ-law, the pattern of a decoded signal 8a outputted from the decoder 7 should be the same as an input test pattern shown in the table of FIG. 16. However, when the decoder 7 is incorrectly operated by the A-law by the error in the companding law setting signal 14c, the pattern of the decoded signal 8a outputted from the decoder 7 shows values in a table of FIG. 17.

The signal series shown in the table of FIG. 16 and the signal series shown in the table of FIG. 17 are different from each other. However, when only a sign bit is noticed, a period of the sign bit of the signal series in the table of FIG. 16 is equal to a period of the sign bit of the signal series shown in the table of FIG. 17. Further, the frequency information detecting section 100 for judging existence or nonexistence of the continuity of a channel by detecting periodic repetition of the sign bit should originally judge that the continuity does not exist when there is an error in setting of the companding law of the decoder 7. However, a problem exists in that the frequency information detecting section 100 judges that the continuity of the channel exists.

The above explanation is made with respect to the operation of the channel check test system when the companding law of the decoder 7 is set erroneously. However, there is also a similar problem in the operation of the channel check test system when the companding law of the encoder 6 is set erroneously.

To solve the above-mentioned problems, an object of this invention is to provide a channel check test system applicable to a DCME and able to perform a detecting operation including an error in setting of a companding law (A-law/μ-law) and able to be realized by a simple structure.

DISCLOSURE OF THE INVENTION

To achieve this object, a channel check test system according to this invention comprises a transmitting side DCME including an input pattern generator for generating a nonlinear quantized input test pattern; a test pattern insertion circuit for inserting an output signal of the input pattern generator into a channel to be tested; and an encoder for encoding an output signal of the test pattern insertion circuit with high efficiency; and a receiving side DCME including a decoder for decoding a received signal from the channel to be tested; a linear converting section for converting the decoded signal to a linear quantized PCM signal; an adder for adding a predetermined offset value to an output value of the linear converting section; a sign extracting section for extracting a sign from an output signal of the adder; a delay unit for delaying the extracted sign by a predetermined time; an exclusive OR arithmetic unit for performing an exclusive OR operation of the extracted sign and an output signal of the delay unit; a counter for counting the number of times of conformity in which an output value of the exclusive OR arithmetic unit is in conformity with a predetermined value; and a comparator for comparing a counted value of the counter and a predetermined threshold value and outputting judged results.

In the channel check test system according to this invention, the receiving side DCME includes a second comparator for comparing the output value of the linear converting section and a second predetermined threshold value instead of the adder and the sign extracting section; the delay unit delays an output signal of the second comparator by a predetermined time; and the exclusive OR arithmetic unit performs the exclusive OR operation of the output signal of the second comparator and the output signal of the delay unit.

Further, a channel check test system according to this invention comprises a transmitting side DCME including an input pattern generator for generating a nonlinear quantized input test pattern; a test pattern insertion circuit for inserting an output signal of the input pattern generator into a channel to be tested; and an encoder for encoding an output signal of the test pattern insertion circuit with high efficiency; and a receiving side DCME including a decoder for decoding a received signal from the channel to be tested; a linear converting section for converting the decoded signal to a linear quantized PCM signal; an adder for adding a predetermined offset value to an output value of the linear converting section; a zero crossing number calculating section for calculating a zero crossing number of an output value of the adder; a first comparator for comparing a value of the zero crossing number outputted from the zero crossing number calculating section and a first predetermined threshold value and outputting first compared result; a second comparator for comparing the value of the zero crossing number outputted from the zero crossing number calculating section and a second predetermined threshold value and outputting second compared result; and a judging circuit for judging existence or nonexistence of continuity of the channel to be tested on the basis of the first and second compared results.

In the channel check test system according to this invention, the receiving side DCME includes a zero crossing interval calculating section for calculating a zero crossing interval of an output value of the adder instead of the zero crossing number calculating section; the first comparator compares a value of the zero crossing interval outputted from the zero crossing interval calculating section and the first predetermined threshold value, and outputs the first compared results; and the second comparator compares the value of the zero crossing interval outputted from the zero crossing interval calculating section and the second predetermined threshold value, and outputs the second compared results.

In the channel check test system according to this invention, the receiving side DCME includes a level crossing number calculating section for calculating a level crossing number of the output value of the linear converting section instead of the adder and the zero crossing number calculating section; the first comparator compares a value of the level crossing number outputted from the level crossing number calculating section and the first predetermined threshold value, and outputs the first compared results; and the second comparator compares the value of the level crossing number outputted from the level crossing number calculating section and the second predetermined threshold value, and outputs the second compared results.

In the channel check test system according to this invention, the receiving side DCME includes a level crossing interval calculating section for calculating a level crossing interval of the output value of the linear converting section instead of the adder and the zero crossing number calculating section; the first comparator compares a value of the level crossing interval outputted from the level crossing interval calculating section and the first predetermined threshold value, and outputs the first compared results; and the second comparator compares the value of the level crossing interval outputted from the level crossing interval calculating section and the second predetermined threshold value, and outputs the second compared results.

Further, a channel check test system according to this invention comprises a transmitting side DCME including an input pattern generator for generating a nonlinear quantized input test pattern; a test pattern insertion circuit for inserting an output signal of the input pattern generator into a channel to be tested; and an encoder for encoding an output signal of the test pattern insertion circuit with high efficiency; and a receiving side DCME including a decoder for decoding a received signal from the channel to be tested; a linear converting section for converting the decoded signal to a linear quantized PCM signal; a zero crossing number calculating section for calculating a zero crossing number of an output value of the linear converting section; a level crossing number calculating section for calculating a level crossing number of the output value of the linear converting section; a subtracter for calculating the difference between the calculated zero crossing number and the calculated level crossing number; an absolute value circuit for calculating an absolute value of an output value of the subtracter; a comparator for comparing an output value of the absolute value circuit and a predetermined threshold value and outputting compared result; and a judging circuit for judging existence or nonexistence of continuity of the channel to be tested on the basis of the compared result.

In the channel check test system according to this invention, the receiving side DCME includes a zero crossing interval calculating section for calculating a zero crossing interval of the output value of the linear converting section and a level crossing interval calculating section for calculating a level crossing interval of the output value of the linear converting section instead of the zero crossing number calculating section and the level crossing number calculating section; and the subtracter calculates the difference between the calculated zero crossing interval and the calculated level crossing interval.

In the channel check test system according to this invention, the receiving side DCME further includes a signal intensity calculating section for calculating intensity of the output signal of the linear converting section; a signal intensity judging section including a fourth comparator for comparing the calculated signal intensity and a fourth predetermined threshold value and outputting fourth compared results, and a fifth comparator for comparing the calculated signal intensity and a fifth predetermined threshold value and outputting fifth compared results; and a judging circuit for judging existence or nonexistence of continuity of the channel to be tested on the basis of the all compared results.

In the channel check test system according to this invention, the receiving side DCME further includes a signal intensity calculating section for calculating intensity of the output signal of the linear converting section; and a signal intensity judging section including a fourth comparator for comparing the calculated signal intensity and a fourth predetermined threshold value and outputting fourth compared results, and a fifth comparator for comparing the calculated signal intensity and a fifth predetermined threshold value and outputting fifth compared results; and the judging circuit judges existence or nonexistence of continuity of the channel to be tested on the basis of the all compared results.

In the channel check test system according to this invention, the predetermined time in the delay unit is set to be a multiple of the time of a half period of the input test pattern.

BRIEF DESCRIPTION OF THE DRAWINGS

FIG. 2 is a diagram showing an operation of the channel check test system in accordance with the embodiment mode 1 of this invention.

FIG. 3 is a diagram showing the operation of the channel check test system in accordance with the embodiment mode 1 of this invention.

FIG. 14 is a diagram showing an operation of another conventional channel check test system.

FIG. 16 is a diagram showing a table for explaining an operation of another conventional channel check test system in an example in which another conventional channel check test system is applied to the DCME.

FIG. 17 is a diagram showing the table for explaining the operation of another conventional channel check test system in the example in which another conventional channel check test system is applied to the DCME.

BEST MODE FOR CARRYING OUT THE INVENTION

Embodiment Mode 1

Figure 1:
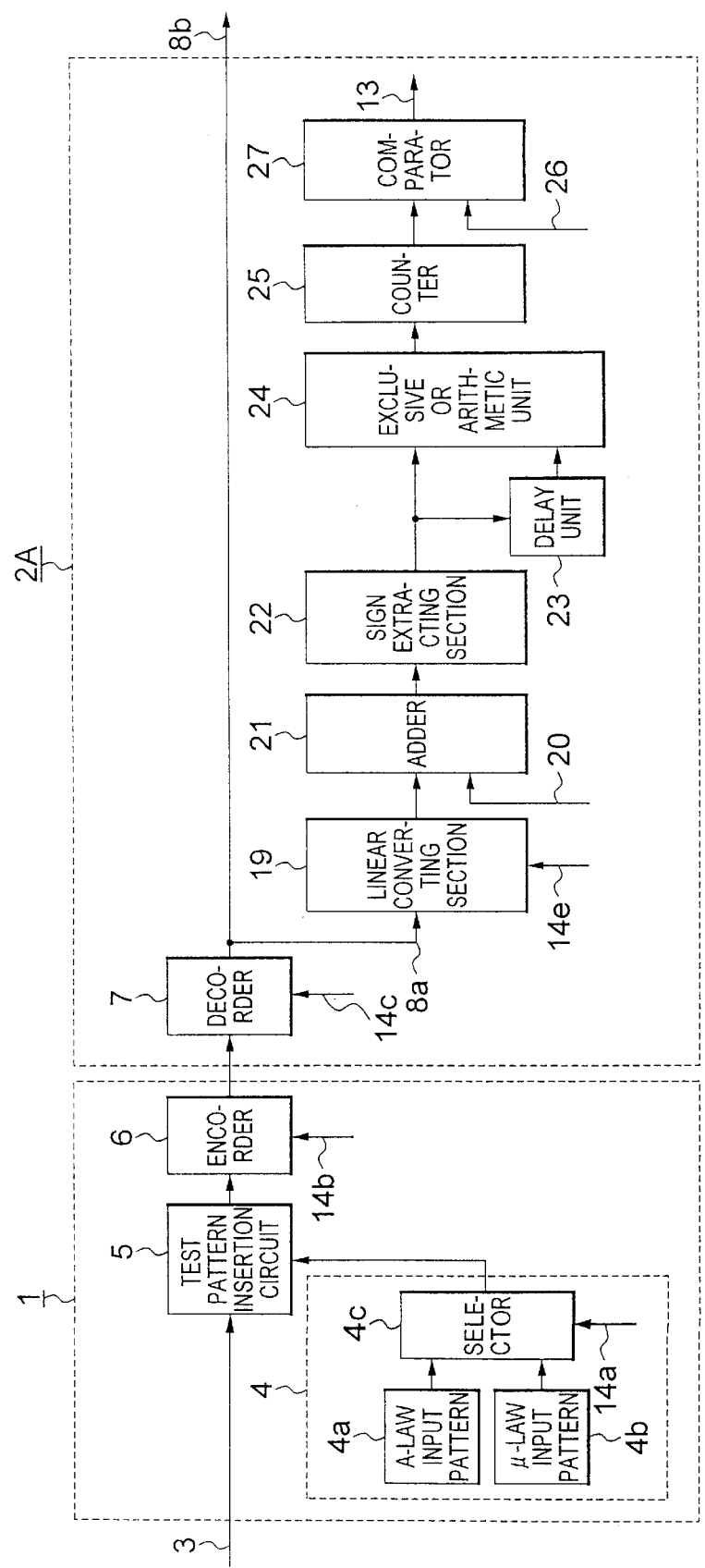
FIG. 1 is a diagram showing the structure of a channel check test system in accordance with an embodiment mode 1 of this invention.

A channel check test system in accordance with an embodiment mode 1 of this invention will be explained with reference to the drawings. FIG. 1 is a diagram showing the structure of the channel check test system in accordance with the embodiment mode 1 of this invention. In the respective figures, the same reference numerals show the same or corresponding portions.

In FIG. 1, reference numerals 1, 2A and 3 respectively designate a transmitting side DCME, a receiving side DCME and an input signal nonlinear-quantized by an A-law or a $\mu$-law and inputted to the transmitting side DCME 1. An input pattern generator 4 generates an input test pattern nonlinear-quantized by the A-law or the $\mu$-law. An A-law input pattern data memory 4a stores input test pattern data nonlinear-quantized by the A-law. A $\mu$-law input pattern data memory 4b stores input test pattern data nonlinear-quantized by the $\mu$-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the $\mu$-law and outputted from the decoder 7, and an output signal nonlinear-quantized by the A-law or the $\mu$-law from the receiving side DCME 2A. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the μ-law to a linear quantized PCM signal. Reference numeral 20 designates an offset value. An adder 21 adds the offset value 20 to an output value of the linear converting section 19. A sign extracting section 22 extracts a sign of an output signal of the adder 21. A delay unit 23 delays the sign outputted from the sign extracting section 22. An exclusive OR arithmetic unit 24 performs an exclusive OR operation of the sign outputted from the sign extracting section 22 and an output signal of the delay unit 23. A counter 25 counts the number of times of conformity in which an output of the exclusive OR arithmetic unit 24 is in conformity with a predetermined value. Reference numerals 26 and 27 respectively designate a threshold value and a comparator for comparing an output signal of the counter 25 and the threshold value 26.

An operation of the channel check test system in accordance with the above embodiment mode 1 will next be explained with reference to the drawings. An internal operation of the transmitting side DCME 1 will first be explained.

The input pattern generator 4 generates an input test pattern for checking a channel, e.g., a tone signal. A period of this test pattern is desirably a multiple of a sampling period of a signal inputted to the transmitting side DCME 1.

It is necessary to conform a companding law (A-law or μ-law) of the input test pattern outputted, from the input pattern generator 4 to a companding law of the encoder 6 of a channel to be tested. Further, one of output data of the A-law input pattern data memory 4a and output data of the μ-law input pattern data memory 4b is selected in accordance with the companding law setting signal 14a in the selector 4c and is made to be an output signal of the input pattern generator 4.

The input test pattern outputted from this input pattern generator 4 is inputted to the test pattern insertion circuit 5. The test pattern insertion circuit 5 inserts the input test pattern for the channel check outputted from the input pattern generator 4 into the channel to be tested, and outputs the input test pattern. In contrast to this, the test pattern insertion circuit 5 outputs the input signal 3 inputted to the transmitting side DCME 1 as it is with respect to an operating channel which is not a testing.

The encoder 6 encodes the output signal of the test pattern insertion circuit 5 with high efficiency by using a coding system prescribed in e.g., ITU Recommendations G.726, G.728, G.729, etc., and outputs the encoded signal to the receiving side DCME 2A. An operating mode (A-law or μ-law) of this encoder 6 is determined in accordance with the companding law setting signal 14b.

An internal operation of the receiving side DCME 2A will subsequently be explained.

The decoder 7 decodes an encoded signal transmitted from the transmitting side DCME 1. The decoded signal 8a outputted from this decoder 7 is made to be an output signal 8b from the receiving side DCME 2A and the continuity of a channel to be tested is checked on the basis of this decoded signal 8a within the receiving side DCME 2A. An operating mode (A-law or μ-law) of this decoder 7 is determined in accordance with the companding law setting signal 14c.

The linear converting section 19 converts the decoded signal 8a nonlinear-quantized by the A-law or the μ-law and outputted from the decoder 7 to a linear quantized PCM signal. A companding law (A-law or μ-law) of the decoded signal 8a is notified to the linear converting section 19 by the companding law setting signal 14e. The linear converting section 19 converts the decoded signal 8a to the linear quantized PCM signal in accordance with the notified companding law.

The adder 21 adds a predetermined offset value 20 to the linear quantized PCM signal outputted from the linear converting section 19. It is necessary to select a non-zero value within the range of an amplitude of the test pattern as this offset value 20. This offset value 20 may be set to a positive or negative value.

The sign extracting section 22 extracts a sign from an output signal of the adder 21. The sign extracting section 22 outputs zero when the sign is positive. The sign extracting section 22 outputs one when the sign is negative.

The sign outputted from this sign extracting section 22 is delayed by a predetermined time in the delay unit 23. It is necessary to set the delay time in this delay unit 23 to a multiple of the time of a half period of the test pattern. However, in view of a reduction in hardware scale of the delay unit 23, the delay time in this delay unit 23 is normally set to a value equal to the time of the half period of the test pattern.

The operation of the channel check test system will next be explained when the delay time in the delay unit 23 is set to a value of the half period of the test pattern multiplied by an odd number.

The exclusive OR arithmetic unit 24 performs an exclusive OR operation of the sign outputted from the sign extracting section 22 and an output signal of the delay unit 23, and outputs the results of this exclusive OR operation. Namely, the exclusive OR arithmetic unit 24 outputs zero when the sign outputted from the sign extracting section 22 is equal to a value shown by the output signal of the delay unit 23. The exclusive OR arithmetic unit 24 outputs one when the sign outputted from the sign extracting section 22 is different from the value shown by the output signal of the delay unit 23.

The counter 25 counts the number of times of conformity in which an output of the exclusive OR arithmetic unit 24 is in conformity with a predetermined value, e.g., one, during a constant time after the channel check test is started.

FIG. 2 is a diagram showing one example of an operation of each portion in the channel check test system according to this embodiment mode 1 when the continuity of the testing channel exists.

In FIG. 2, the sign outputted from the sign extracting section 22 shown in FIG. 2(d) is different from the value shown by the output signal (shown in FIG. 2(e)) of the delay unit 23 provided by delaying this sign by the time of a half period of the test pattern. Therefore, the output value of the exclusive OR arithmetic unit 24 becomes one. Accordingly, an output value of the counter 25 becomes a large value.

In contrast to this, when the continuity of the testing channel does not exist, the sign outputted from the sign extracting section 22 is not necessarily different from the value shown by the output signal of the delay unit 23 provided by delaying this sign by the time of the half period of the test pattern at any time. Therefore, the output value of the exclusive OR arithmetic unit 24 becomes zero and one. Accordingly, the output value of the counter 25 becomes a small value in comparison with a case in which the continuity of the testing channel exists.

FIG. 3 is a diagram showing one example of an operation of each portion when a PCM companding law is set erroneously in one of the transmitting side DCME 1 and the receiving side DCME 2A.

In FIG. 3, after a predetermined offset value 20 is added to an output value of the linear converting section 19 in the adder 21, a sign is extracted in the sign extracting section 22. Therefore, the sign outputted from the sign extracting section 22 shown in FIG. 3(a) is not always different from a value shown by an output signal (shown in FIG. 3(e)) of the delay unit 23 provided by delaying this sign by the time of a half period of the test pattern. Therefore, the output value of the exclusive OR arithmetic unit 24 becomes zero and one. Accordingly, the output value of the counter 25 becomes a small value in comparison with a case in which the continuity of the testing channel exists.

The comparator 27 compares the output value of the counter 25 and a predetermined threshold value 26. When the output value of the counter 25 is greater than the threshold value 26, the comparator 27 judges that the continuity of the testing channel exists, and outputs one as judged results 13. In contrast to this, when the output value of the counter 25 is smaller than the threshold value 26, the comparator 27 judges that the continuity of the testing channel does not exist, and outputs zero as the judged results 13.

If the channel check test system is constructed as mentioned above, existence or nonexistence of the continuity of the channel to be tested can be simply checked, including an error in setting of the PCM companding law in one of the transmitting side DCME 1 and the receiving side DCME 2A.

In the above embodiment mode 1, the tone signal is used as the test pattern, but a periodic signal as well as the tone signal may be also used as the test pattern.

In the above embodiment mode 1, the delay time in the delay unit 23 is set to a value of the half period of the test pattern multiplied by an odd number. Therefore, when the counter 25 counts the number of times of the output of the exclusive OR arithmetic unit 24 conforming to one and the output value of the counter 25 is greater than the threshold value 26 in the comparator 27, the comparator 27 judges that the continuity of the testing channel exists. However, when this delay time is set to a value of the half period of the test pattern multiplied by an even number (namely, a multiple of the period of the test pattern), the counter 25 counts the number of times of the output of the exclusive OR arithmetic unit 24 conforming to zero, and the comparator 27 may judge that the continuity of the testing channel exists when the output value of the counter 25 is greater than the threshold value 26.

Embodiment Mode 2

Figure 4:
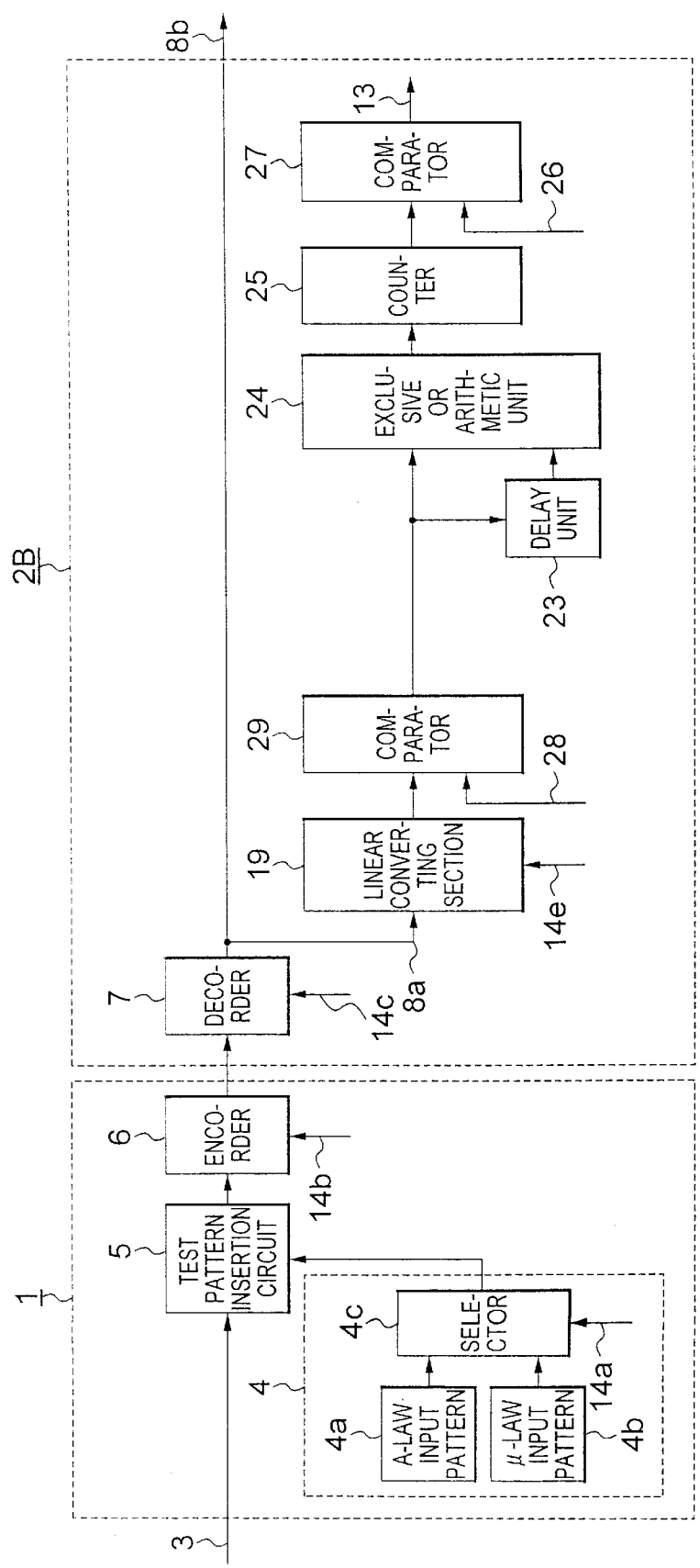
FIG. 4 is a diagram showing the structure of a channel check test system in accordance with an embodiment mode 2 of this invention.

A channel check test system in accordance with an embodiment mode 2 of this invention will next be explained with reference to the drawings. FIG. 4 is a diagram showing the structure of the channel check test system in accordance with the embodiment mode 2 of this invention.

In FIG. 4, reference numerals 1, 2B and 3 respectively designate a transmitting side DCME, a receiving side DCME and an input signal nonlinear-quantized by an A-law or a $\mu$-law and inputted to the transmitting side DCME 1. An input pattern generator 4 generates an input test pattern nonlinear-quantized by the A-law or the $\mu$-law. An $\mu$-law input pattern data memory 4a stores input test pattern data nonlinear-quantized by the A-law. A $\mu$-law input pattern data memory 4b stores input test pattern data nonlinear-quantized by the $\mu$-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the $\mu$-law and outputted from the decoder 7, and an output signal nonlinear-quantized by the A-law or the $\mu$-law from the receiving side DCME 2B. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the $\mu$-law to a linear quantized PCM signal. A delay unit 23 delays an output signal of a comparator described later. An exclusive OR arithmetic unit 24 performs an exclusive OR operation of the output signal of the comparator described later and an output signal of the delay unit 23. A counter 25 counts the number of times of conformity in which an output of the exclusive OR arithmetic unit 24 is in conformity with a predetermined value. Reference numerals 26 and 27 respectively designate a threshold value and a comparator for comparing an output signal of the counter 25 and the threshold value 26. Reference numeral 28 designates a threshold value. A comparator 29 compares an output signal of the linear converting section 19 and the threshold value 28.

An operation of the channel check test system in accordance with the above embodiment mode 2 will next be explained with reference to the drawings.

Operations of the input pattern generator 4, the test pattern insertion circuit 5, the encoder 6, the decoder 7, the linear converting section 19, the delay unit 23, the exclusive OR arithmetic unit 24, the counter 25 and the comparator 27 are equal to those in the above embodiment mode 1 and their explanations are therefore omitted here.

The comparator 29 compares the output signal of the linear converting section 19 and the predetermined threshold value 28 and outputs results of this comparison. For example, the comparator 29 outputs zero when a value shown by the output signal of the linear converting section 19 is greater than the threshold value 28. In contrast to this, the comparator 29 outputs one when the value shown by the output signal of the linear converting section 19 is smaller than the threshold value 28. It is necessary to select a non-zero value within the range of an amplitude of the test pattern as this threshold value 28. Further, this threshold value 28 may be a positive or negative value.

If the channel check test system is constructed as mentioned above, the same operation as in the above embodiment mode 1, the extraction of a sign after a predetermined offset value 20 is added to the output signal of the linear converting section 19, can be realized by comparing the output signal of the linear converting section 19 and the threshold value 28 in the comparator 29. As a result, existence or nonexistence of the continuity of a channel to be tested can be checked by a simpler structure having no adder, including an error in setting of the PCM companding law in one of the transmitting side DCME 1 and the receiving side DCME 2B.

Embodiment Mode 3

Figure 5:
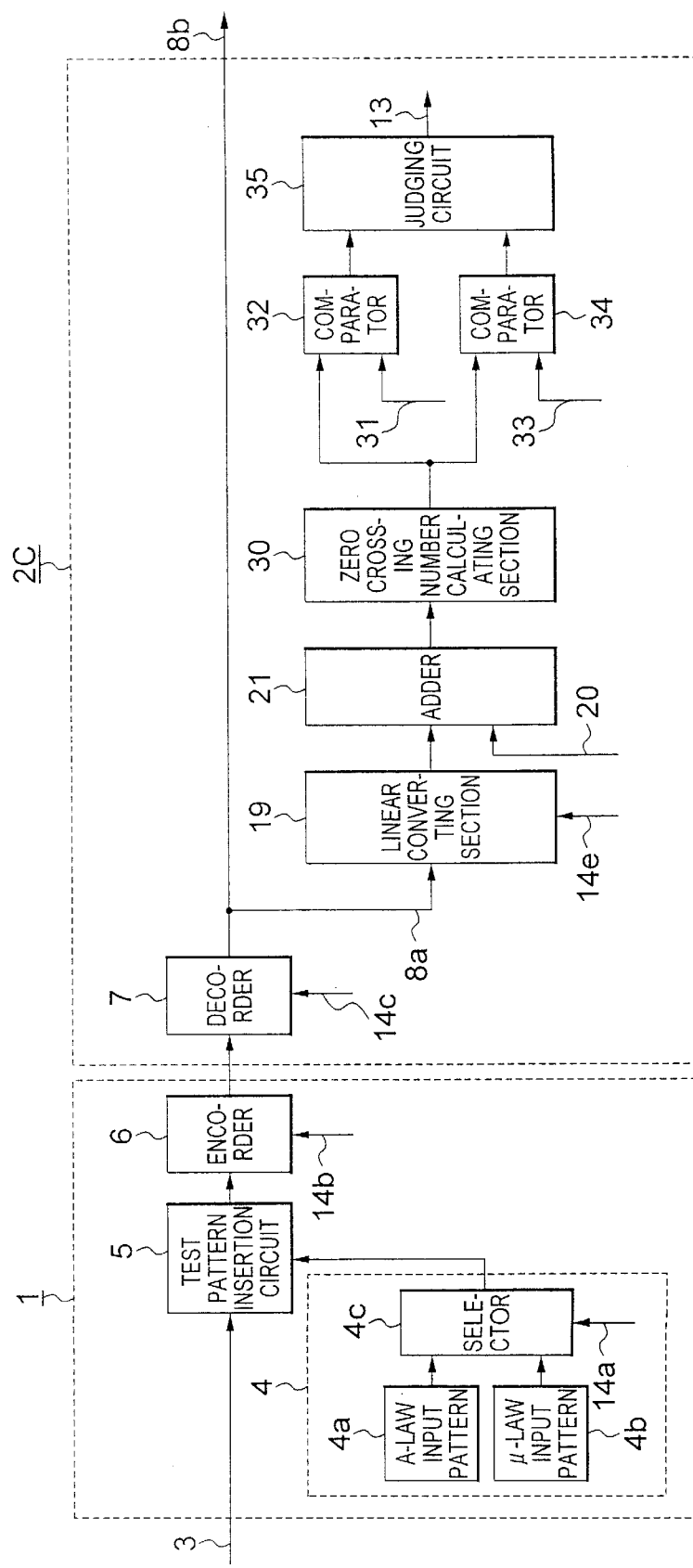
FIG. 5 is a diagram showing the structure of a channel check test system in accordance with an embodiment mode 3 of this invention.

A channel check test system in accordance with an embodiment mode 3 of this invention will be explained with reference to the drawings. FIG. 5 is a diagram showing the structure of the channel check test system in accordance with the embodiment mode 3 of this invention.

In FIG. 5, reference numerals 1, 2C and 3 respectively designate a transmitting side DCME, a receiving side DCME and an input signal nonlinear-quantized by an A-law or a $\mu$-law and inputted to the transmitting side DCME 1. An input pattern generator 4 generates an input test pattern nonlinear-quantized by the A-law or the $\mu$-law. An A-law input pattern data memory 4a stores input test pattern data nonlinear-quantized by the A-law. A $\mu$-law input pattern data memory 4b stores input test pattern data nonlinear-quantized by the $\mu$-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b air respectively designate a decoder for decoding the encoded signal, a decoded signal nonlinear-quantized by the A-law or the $\mu$-law and outputted from the decoder 7, and an output signal nonlinear-quantized by the A-law or the $\mu$-law from the receiving side DCME 2C. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the $\mu$-law to a linear quantized PCM signal. Reference numeral 20 designates an offset value. An adder 21 adds the offset value 20 to an output value of the linear converting section 19. A zero crossing number calculating section 30 calculates a zero crossing number with respect to an output value of the adder 21. Reference numeral 31 designates a threshold value. A comparator 32 compares an output value of the zero crossing number calculating section 30 and the threshold value 31. Reference numeral 33 designates a threshold value. A comparator 34 compares the output value of the zero crossing number calculating section 30 and the threshold value 33. A judging circuit 35 judges existence or nonexistence of the continuity of a channel on the basis of output values of the comparators 32 and 34.

An operation of the channel check test system in accordance with the above embodiment mode 3 will next be explained with reference to the drawings.

An operation of the transmitting side DCME 1 is the same as the above embodiment mode 1 and its explanation is therefore omitted here. An internal operation of the receiving side DCME 2C will next be explained.

The decoder 7 decodes an encoded signal transmitted from the transmitting side DCME 1. The decoded signal 8a outputted from this decoder 7 is made to be an output signal 8b from the receiving side DCME 2C and the continuity of a channel to be tested is checked on the basis of this decoded signal 8a within the receiving side DCME 2C. An operating-mode (A-law or $\mu$-law) of this decoder 7 is determined in accordance with the companding law setting signal 14c.

The linear converting section 19 converts the decoded signal 8a nonlinear-quantized by the A-law or the $\mu$-law and outputted from the decoder 7 to a linear quantized PCM signal. A companding law (A-law or $\mu$-law) of the decoded signal 8a is notified to the linear converting section 19 by the companding law setting signal 14e. The linear converting section 19 converts the decoded signal 8a to the linear quantized PCM signal in accordance with the notified companding law.

The adder 21 adds a predetermined offset value 20 to the linear quantized PCM signal outputted from the linear converting section 19. It is necessary to select a non-zero value within the range of an amplitude of the test pattern as this offset value 20. This offset value 20 may be set to a positive or negative value.

The zero crossing number calculating section 30 calculates a zero crossing number with respect to an output signal of the adder 21, namely, the number of times of crossing in which the output signal of the adder 21 crosses a zero level within a predetermined time.

The comparator 32 compares a value of the zero crossing number outputted from the zero crossing number calculating section 30 with the predetermined threshold value 31, and outputs results of this comparison. Namely, the comparator 32 outputs one when the value of the zero crossing number is greater than the threshold value 31. In contrast to this, the comparator 32 outputs zero when the value of the zero crossing number is smaller than the threshold value 31.

The comparator 34 compares the value of the zero crossing number outputted from the zero crossing number calculating section 30 with the predetermined threshold value 33, and outputs results of this comparison. Namely, the comparator 34 outputs one when the value of the zero crossing number is greater than the threshold value 33. In contrast to this, the comparator 34 outputs zero when the value of the zero crossing number is smaller than the threshold value 33. Here, the threshold value 33 is set to be smaller than the above threshold value 31.

The judging circuit 35 judges existence or nonexistence of the continuity of the channel to be tested on the basis of the output values of the comparators 32 and 34. When the output value of the comparator 32 is zero and the output value of the comparator 34 is one, the judging circuit 35 judges that the continuity of the testing channel exists. In a case except for this case, the judging circuit 35 judges that the continuity of the testing channel does not exist. The judging circuit 35 then outputs results 13 of this judgment.

An expected value of an output of the zero crossing number calculating section 30 during the time when the test pattern is being inputted is determined by a period of the test pattern and the length of a time window in the calculation of the zero crossing number. Namely, the expected value P of the zero crossing number is calculated as $P=2L/T$ from the period T of the test pattern and the length L of the time window in the calculation of the zero crossing number.

The above threshold value 31 is set to $P+\Delta P$ and the above threshold value 33 is set to $P-\Delta P$. Here, $\Delta P$ is set to an upper limit value of the magnitude of a variation from the expected value P of the output value of the zero crossing number calculating section 30 when the continuity of the testing channel exists. When the continuity of the testing channel exists, the output value of the zero crossing number calculating section 30 is smaller than the threshold value 31 and is greater than the threshold value 33. Therefore, the output value of the comparator 32 becomes zero and the output value of the comparator 34 becomes one. The judging circuit 35 judges that the continuity of the testing channel exists.

In contrast to this, when the continuity of the testing channel does not exist, the output of the zero crossing number calculating section 30 does not take a value within the range from the threshold value 31 to the threshold value 33. Therefore, the judging circuit 35 judges that the continuity of the testing channel does not exist.

When the PCM companding law is set erroneously in one of the transmitting side DCME 1 and the receiving side DCME 2C, the output value of the zero crossing number calculating section 30 is also different from that provided when the continuity of the testing channel exists. Therefore, the output value of the comparator 32 becomes one, or the output value of the comparator 34 becomes zero. As a result, the judging circuit 35 judges that the continuity of the testing channel does not exist.

If the channel check test system is constructed as mentioned above, existence or nonexistence of the continuity of the channel to be tested can be simply checked, including an error in setting of the PCM companding law in one of the transmitting side DCME 1 and the receiving side DCME 2c.

Embodiment Mode 4

Figure 6:
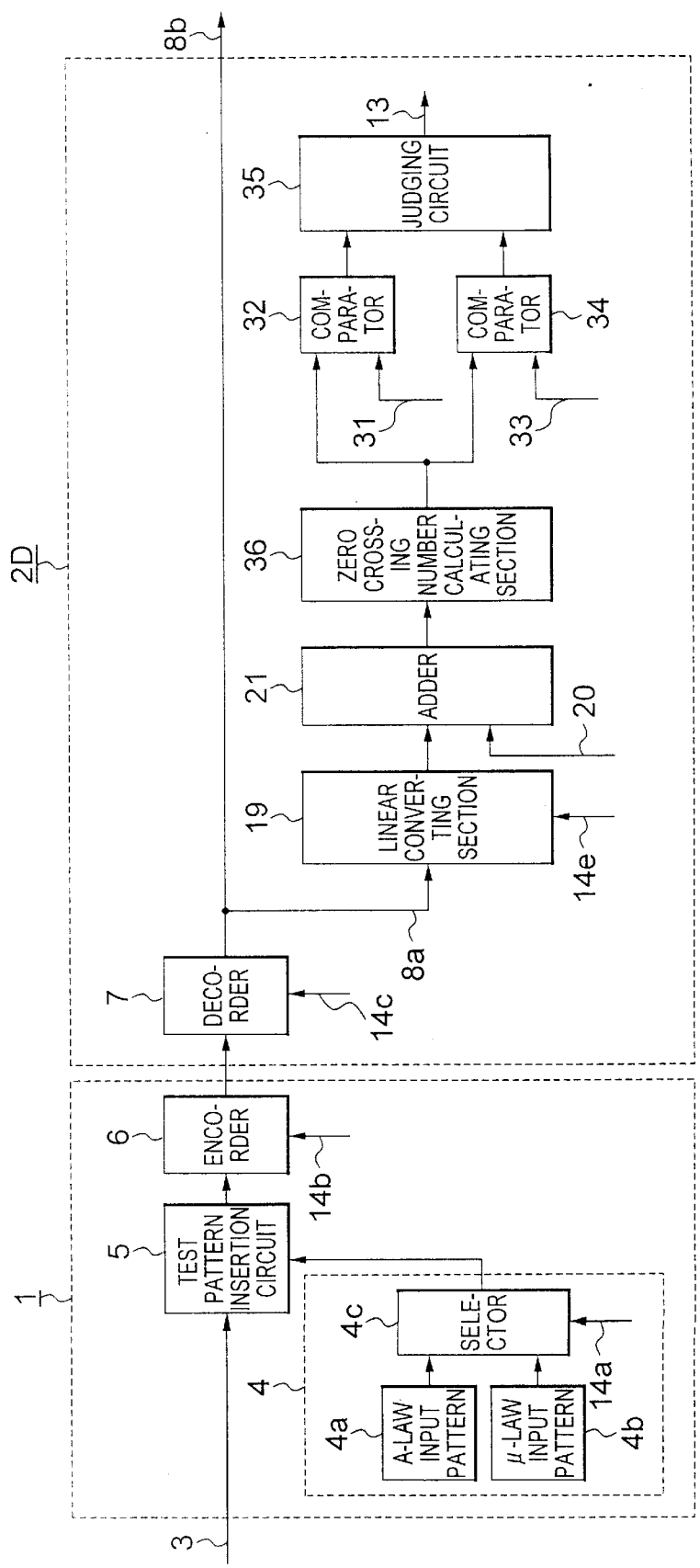
FIG. 6 is a diagram showing the structure of a channel check test system in accordance with an embodiment mode 4 of this invention.

A channel check test system in accordance with an embodiment mode 4 of this invention will be explained with reference to the drawings. FIG. 6 is a diagram showing the structure of the channel check test system in accordance with the embodiment mode 4 of this invention.

In FIG. 6, reference numerals 1, 2D and 3 respectively designate a transmitting side DCME, a receiving side DCME and an input signal nonlinear-quantized by an A-law or a μ-law and inputted to the transmitting side DCME 1. An input pattern generator 4 generates an input test pattern nonlinear-quantized by the A-law or the μ-law. An A-law input pattern data memory 4a stores input test pattern data nonlinear-quantized by the A-law. A μ-law input pattern data memory 4b stores input test pattern data nonlinear-quantized by the μ-law. Reference numeral, 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the μ-law and outputted from the decoder 7, and an output signal nonlinear-quantized by the A-law or the μ-law from the receiving side DCME 2D. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the μ-law to a linear quantized PCM signal. Reference numeral 20 designates an offset value. An adder 21 adds the offset value 20 to an output value of the linear converting section 19. Reference numeral 31 designates a threshold value. A comparator 32 compares an output value of a zero crossing interval calculating section described later and the threshold value 31. Reference numeral 33 designates a threshold value. A comparator 34 compares the output value of the zero crossing interval calculating section described later and the threshold value 33. A judging circuit 35 judges existence or nonexistence of the continuity of a channel on the basis of output values of the comparators 32 and 34. The zero crossing interval calculating section 36 calculates a zero crossing interval with respect to an output value of the adder 21.

An operation of the channel check test system in the above embodiment mode 4 will next be explained with reference to the drawings.

Operations of the input pattern generator 4, the test pattern insertion circuit 5, the encoder 6, the decoder 7 and the linear converting section 19 are equal to those in the above embodiment mode 1 and their explanations are therefore omitted here. Further, an operation of the adder 21 is the same as the above embodiment mode 3 and its explanation is therefore omitted here.

The zero crossing interval calculating section 36 calculates a zero crossing interval with respect to an output signal of the adder 21, namely, a time interval at which the output signal of the adder 21 crosses a zero level within a predetermined time.

The comparator 32 compares a value of the zero crossing interval outputted from the zero crossing interval calculating section 36 and the predetermined threshold value 31, and outputs results of this comparison. Namely, when the value of the zero crossing interval is greater than the threshold value 31, the comparator 32 outputs one. In contrast to this, when the value of the zero crossing interval is smaller than the threshold value 31, the comparator 32 outputs zero.

The comparator 34 compares the value of the zero crossing interval outputted from the zero crossing interval calculating section 36 and the predetermined threshold value 33, and outputs results of this comparison. Namely, when the value of the zero crossing interval is greater than the threshold value 33, the comparator 34 outputs one. In contrast to this, when the value of the zero crossing interval is smaller than the threshold value 33, the comparator 34 outputs zero. Here, the threshold value 33 is set to be smaller than the above threshold value 31.

The judging circuit 35 compares existence or nonexistence of the continuity of the channel to be tested on the basis of the output values of the comparators 32 and 34. When the output value of the comparator 32 is zero and the output value of the comparator 34 is one, the judging circuit 35 judges that the continuity of the testing channel exists. In a case except for this case, the judging circuit 35 judges that the continuity of the testing channel does not exist. The judging circuit 35 then outputs results 13 of this judgment.

An expected value P of an output of the zero crossing interval calculating section 36 during the time when the test pattern is being inputted is a half of the time of a period T of the test pattern, namely, P=T/2.

The above threshold value 31 is set to P+ΔP and the above threshold value 33 is set to P−ΔP. Here, ΔP is set to an upper limit value of the magnitude of a variation from the expected value P of the output value of the zero crossing interval calculating section 36 when the continuity of the testing channel exists. When the continuity of the testing channel exists, the output value of the zero crossing interval calculating section 36 is smaller than the threshold value 31 and is greater than the threshold value 33. Therefore, the output value of the comparator 32 becomes zero and the output value of the comparator 34 becomes one. The judging circuit 35 judges that the continuity of the testing channel exists.

In contrast to this, when the continuity of the testing channel does not exist, the output of the zero crossing interval calculating section 36 does not take a value within the range from the threshold value 31 to the threshold value 33. Therefore, the judging circuit 35 judges that the continuity of the testing channel does not exist.

When the PCM companding law is set erroneously in one of the transmitting side DCME 1 and the receiving side DCME 2D, the output value of the zero crossing interval calculating section 36 is also different from that provided when the continuity of the testing channel exists. Therefore, the output value of the comparator 32 becomes one, or the output value of the comparator 34 becomes zero. As a result, the judging circuit 35 judges that the continuity of the testing channel does not exist.

If the channel check test system is constructed as mentioned above, existence or nonexistence of the continuity of the channel to be tested can be simply checked, including an error in setting of the PCM companding law in one of the transmitting side DCME 1 and the receiving side DCME 2D.

Embodiment Mode 5

Figure 7:
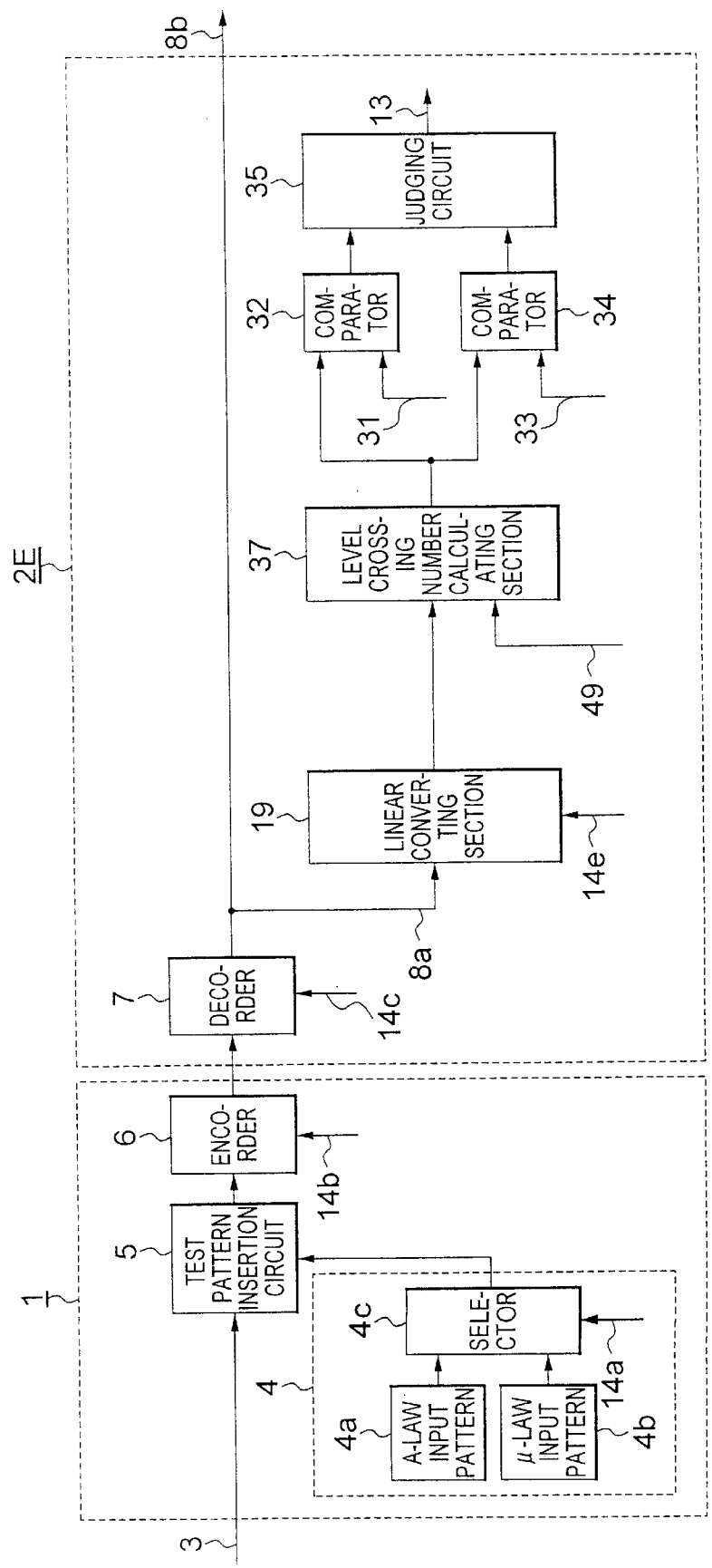
FIG. 7 is a diagram showing the structure of a channel check test system in accordance with an embodiment mode 5 of this invention.

A channel check test system in accordance with an embodiment mode 5 of this invention will be explained with reference to the drawings. FIG. 7 is a diagram showing the structure of the channel check test system in accordance with the embodiment mode 5 of this invention.

In FIG. 7, reference numerals 1, 2E and 3 respectively designate a transmitting side DCME, a receiving side DCME and an input signal nonlinear-quantized by an A-law or a μ-law and inputted to the transmitting side DCME 1. An input pattern generator 4 generates an input test pattern nonlinear-quantized by the A-law or the μ-law. An A-law input pattern data memory 4a stores input test pattern data nonlinear-quantized by the A-law. A μ-law input pattern data memory 4b stores input test pattern data nonlinear-quantized by the μ-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the μ-law and outputted from the decoder 7, and an output signal nonlinear-quantized by the A-law or the μ-law from the receiving side DCME 2E. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the μ-law to a linear quantized PCM signal. Reference numeral 31 designates a threshold value. A comparator 32 compares an output value of a level crossing number calculating section described later and the threshold value 31. Reference numeral 33 designates a threshold value. A comparator 34 compares the output value of the level crossing number calculating section described later and the threshold value 33. A judging circuit 35 judges existence or nonexistence of the continuity of a channel on the basis of output values of the comparators 32 and 34. The level crossing number calculating section 37 calculates a level crossing number with respect to an output value of the linear converting section 19. Reference numeral 49 designates a threshold value.

An operation of the channel check test system in the above embodiment mode 5 will next be explained with reference to the drawings.

Operations of the input pattern generator 4, the test pattern insertion circuit 5, the encoder 6, the decoder 7 and the linear converting section 19 are equal to those in the above embodiment mode 1 and their explanations are therefore omitted here. Further, operations of the comparators 32, 34 and the judging circuit 35 are equal to those in the above embodiment mode 3 and their explanations are therefore omitted here.

The level crossing number calculating section 37 calculates a level crossing number with respect to an output signal of the linear converting section 19, namely, the number of times of crossing in which the output signal of the linear converting section 19 crosses the threshold value 49 within a predetermined time. It is necessary to select a non-zero value within the range of an amplitude of the test pattern as this threshold value 49. Further, this threshold value 49 may be a positive or negative value.

If the channel check test system is constructed as mentioned above, the same operation as in the above embodiment mode 3, the calculation of the zero crossing number after a predetermined offset value 20 is added to the output signal of the linear converting section 19, can be realized by calculating the number of times of crossing in which the output signal of the linear converting section 19 crosses the threshold value 49 in the level crossing number calculating section 37. As a result, existence or nonexistence of the continuity of a channel to be tested can be checked by a simpler structure having no adder, including an error in setting of a PCM companding law in one of the transmitting side DCME 1 and the receiving side DCME 2E.

Embodiment Mode 6

Figure 8:
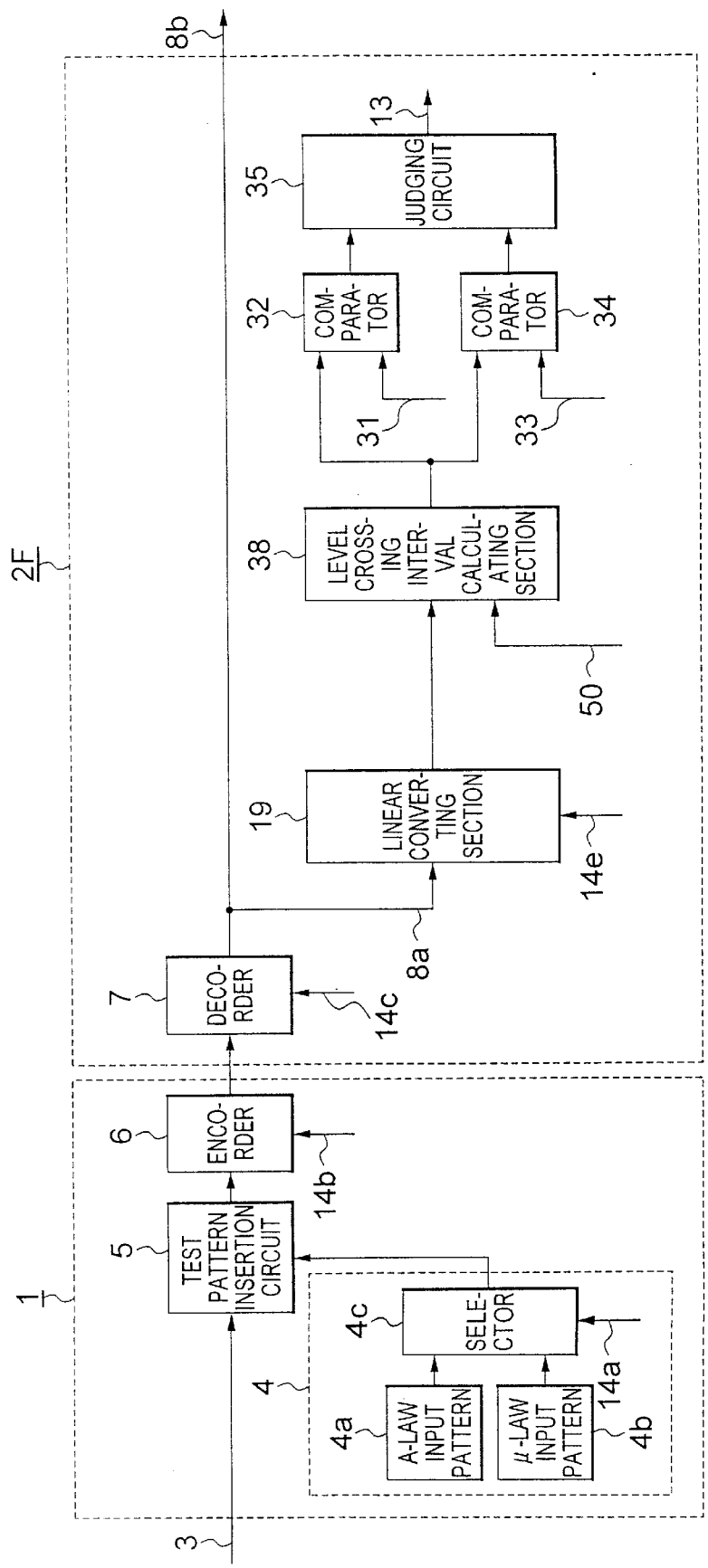
FIG. 8 is a diagram showing the structure of a channel check test system in accordance with an embodiment mode 6 of this invention.

A channel check test system in accordance with an embodiment mode 6 of this invention will be explained with reference to the drawings. FIG. 8 is a diagram showing the structure of the channel check test system in accordance with the embodiment mode 6 of this invention.

In FIG. 8, reference numerals 1, 2F and 3 respectively designate a transmitting side DCME, a receiving side DCME and an input signal nonlinear-quantized by an A-law or a μ-law and inputted to the transmitting side DCME 1. An input pattern generator 4 generates an input test pattern nonlinear-quantized by the A-law or the μ-law. An A-law input pattern data memory 4a stores input test pattern data nonlinear-quantized by the A-law. A μ-law input pattern data memory 4b stores input test pattern data nonlinear-quantized by the μ-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the μ-law and outputted from the decoder 7, and an output signal nonlinear-quantized by the A-law or the μ-law from the receiving side DCME 2F. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the μ-law to a linear quantized PCM signal. Reference numeral 31 designates a threshold value. A comparator 32 compares an output value of a level crossing interval calculating section described later and the threshold value 31. Reference numeral 33 designates a threshold value. A comparator 34 compares the output value of the level crossing interval calculating section described later and the threshold value 33. A judging circuit 35 judges existence or nonexistence of the continuity of a channel on the basis of output values of the comparators 32 and 34. The level crossing interval calculating section 38 calculates a level crossing interval with respect to an output value of the linear converting section 19. Reference numeral 50 designates a threshold value.

An operation of the channel check test system in the above embodiment mode 6 will next be explained with reference to the drawings.

Operations of the input pattern generator 4, the test pattern insertion circuit 5, the encoder 6, the decoder 7 and the linear converting section 19 are equal to those in the above embodiment mode 1 and their explanations are therefore omitted here. Further, operations of the comparators 32, 34 and the judging circuit 35 are equal to those in the above embodiment mode 4 and their explanations are therefore omitted here.

The level crossing interval calculating section 38 calculates a level crossing interval with respect to an output signal of the linear converting section 19, namely, a time interval at which the output signal of the linear converting section 19 crosses the threshold value 50 within a predetermined time. It is necessary to select a non-zero value within the range of an amplitude of the test pattern as this threshold value 50. Further, this threshold value 50 may be a positive or negative value.

If the channel check test system is constructed as mentioned above, the same operation as in the above embodiment mode 4, the calculation of the zero crossing interval after a predetermined offset value 20 is added to the output signal of the linear converting section 19, can be realized by calculating an interval at which the output signal of the linear converting section 19 crosses the threshold value 50 in the level crossing interval calculating section 38. As a result, existence or nonexistence of the continuity of a channel to be tested can be checked by a simpler structure having no adder, including an error in setting of a PCM companding law in one of the transmitting side DCME 1 and the receiving side DCME 2F.

Embodiment Mode 7

Figure 9:
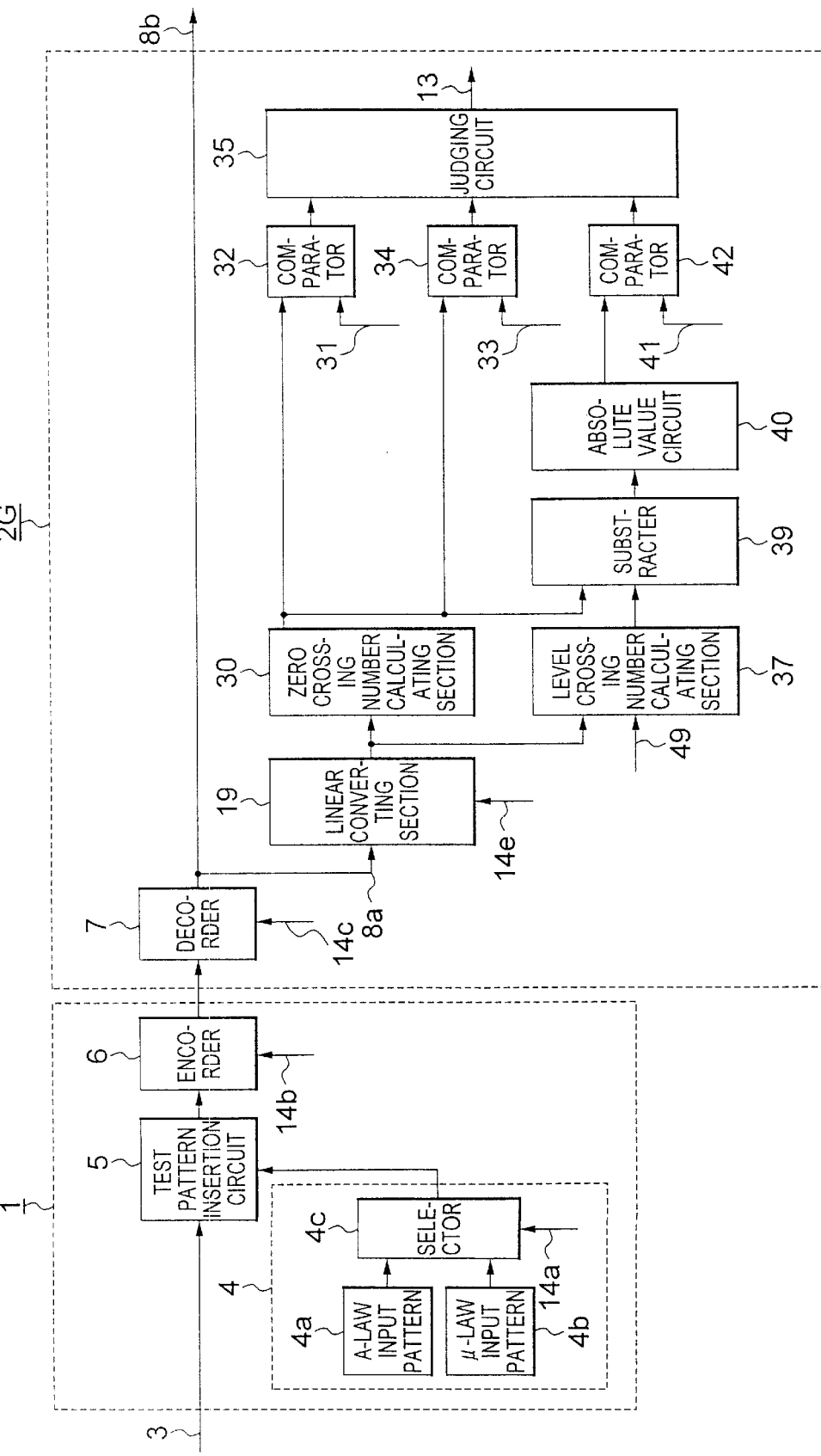
FIG. 9 is a diagram showing the structure of a channel check test system in accordance with an embodiment mode 7 of this invention.

A channel check test system in accordance with an embodiment mode 7 of this invention will be explained with reference to the drawings. FIG. 9 is a diagram showing the structure of the channel check test system in accordance with the embodiment mode 7 of this invention.

In FIG. 9, reference numerals 1, 2G and 3 respectively designate a transmitting side DCME, a receiving side DCME and an input signal nonlinear-quantized by an A-law or a $\mu$-law and inputted to the transmitting side DCME 1. An input pattern generator 4 generates an input test pattern nonlinear-quantized by the A-law or the $\mu$-law. An A-law input pattern data memory 4a stores input test pattern data nonlinear-quantized by the A-law. A $\mu$-law input pattern data memory 4b stores input test pattern data nonlinear-quantized by the $\mu$-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the $\mu$-law and outputted from the decoder 7, and an output signal nonlinear-quantized by the A-law or the $\mu$-law from the receiving side DCME 2G. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the $\mu$-law to a linear quantized PCM signal. A zero crossing number calculating section 30 calculates a zero crossing number with respect to an output value of the linear converting section 19. Reference numeral 31 designates a threshold value. A comparator 32 compares an output value of the zero crossing number calculating section 30 and the threshold value 31. Reference numeral 33 designates a threshold value. A comparator 34 compares the output value of the zero crossing number calculating section 30 and the threshold value 33. A judging circuit 35 judges existence or nonexistence of the continuity of a channel on the basis of output values of the comparators 32, 34 and 42.

Further, in this figure, a level crossing number calculating section 37 calculates a level crossing number with respect to the output value of the linear converting section 19. A subtracter 39 calculates the difference between the zero crossing number and the level crossing number. An absolute value circuit 40 calculates an absolute value of an output value of the subtracter 39. Reference numeral 41 designates a threshold value. A comparator 42 compares an output value of the absolute value circuit 40 and the threshold value 41. Reference numeral 49 designates a threshold value.

An operation of the channel check test system in the above embodiment mode 7 will next be explained with reference to the drawings.

Operations of the input pattern generator 4, the test pattern insertion circuit 5, the encoder 6, the decoder 7 and the linear converting section 19 are equal to those in the above embodiment mode 1 and their explanations are therefore omitted here.

The zero crossing number calculating section 30 calculates a zero crossing number with respect to an output signal of the linear converting section 19, namely, the number of times of crossing in which the output signal of the linear converting section 19 crosses a zero level within a predetermined time.

The comparator 32 compares a value of the zero crossing number outputted from the zero crossing number calculating section 30 with the predetermined threshold value 31, and outputs results of this comparison. Namely, the comparator 32 outputs one when the value of the zero crossing number is greater than the threshold value 31. In contrast to this, the comparator 32 outputs zero when the value of the zero crossing number is smaller than the threshold value 31.

The comparator 34 compares the value of the zero crossing number outputted from the zero crossing number calculating section 30 with the predetermined threshold value 33, and outputs results of this comparison. Namely, the comparator 34 outputs one when the value of the zero crossing number is greater than the threshold value 33. In contrast to this, the comparator 34 outputs zero when the value of the zero crossing number is smaller than the threshold value 33. Here, the threshold value 33 is set to be smaller than the above threshold value 31.

The level crossing number calculating section 37 calculates a level crossing number with respect to the output signal of the linear converting section 19, namely, the number of times of crossing in which the output signal of the linear converting section 19 crosses the threshold value 49 within a predetermined time. It is necessary to select a value except for zero within the range of an amplitude of the test pattern as this threshold value 49. Further, this threshold value 49 may be a positive or negative value.

The subtracter 39 subtracts the value of the level crossing number outputted from the level crossing number calculating section 37 from the value of the zero crossing number outputted from the zero crossing number calculating section 30. The absolute value circuit 40 calculates an absolute value of an output value of the subtracter 39.

The comparator 42 compares an output value of the absolute value circuit 40 with the predetermined threshold value 41, and outputs results of this comparison. Namely, when the output value of the absolute value circuit 40 is greater than the threshold value 41, the comparator 42 outputs one. In contrast to this, when the output value of the absolute value circuit 40 is smaller than the threshold value 41, the comparator 42 outputs zero.

The judging circuit 35 judges existence or nonexistence of the continuity of a channel to be tested on the basis of output values of the comparators 32, 34 and 42, and outputs results 13 of this judgment. When the output value of the comparator 32 is zero and the output value of the comparator 34 is one, the judging circuit 35 judges that there is a large possibility that the continuity of the testing channel exists. In a case except for this case, the judging circuit 35 judges that the continuity of the testing channel does not exist.

Next, when the output value of the comparator 32 is zero and the output value of the comparator 34 is one and the judging circuit 35 judges that there is a large possibility that the continuity of the testing channel exists, the judging circuit 35 makes a detailed judgment as to whether the continuity of the testing channel exists or not on the basis of the output value of the comparator 42. Namely, when the output value of the comparator 42 is zero, the judging circuit 35 judges that the continuity of the testing channel exists. In contrast to this, when the output value of the comparator 42 is one, the judging circuit 35 judges that the continuity of the testing channel does not exist.

As explained in the above embodiment mode 3, an expected value P of an output of the zero crossing number calculating section 30 during the time when the test pattern is being inputted is calculated as P=2 L/T from a period T of the test pattern and the length L of a time window in the calculation of the zero crossing number.

When the above threshold value 31 is set to P+ΔP and the above threshold value 33 is set to P−ΔP and the continuity of the testing channel exists, the output value of the zero crossing number calculating section 30 is smaller than the threshold value 31 and is greater than the threshold value 33. Therefore, the output value of the comparator 32 becomes zero and the output value of the comparator 34 becomes one. Further, since the output value of the zero crossing number calculating section 30 and the output value of the level crossing number calculating section 37 are approximately equal to each other, the output value of the comparator 42 becomes zero. Accordingly, the judging circuit 35 judges that the continuity of the testing channel exists.

In contrast to this, when the continuity of the testing channel does not exist, the output of the zero crossing number calculating section 30 does not take a value within the range between the threshold values 31 and 33. Therefore, the judging circuit 35 judges that the continuity of the testing channel does not exist.

When the PCM companding law is set erroneously, the output value of the zero crossing number calculating section 30 is equal to that provided when the PCM companding law is correctly set and the continuity of the testing channel exists. However, the output value of the level crossing number calculating section 37 is different from this output value of the zero crossing number calculating section 30. Accordingly, since the absolute value calculated in the absolute value circuit 40 with respect to an output of the subtracter 39 is greater than the threshold value 41, the output of the comparator 42 becomes one and the judging circuit 35 judges that the continuity of the testing channel does not exist.

If the channel check test system is constructed as mentioned above, existence or nonexistence of the continuity of the channel to be tested can be simply checked, including an error in setting of the PCM companding law in one of the transmitting side DCME 1 and the receiving side DCME 2G. In the structure of the channel check test system in the above embodiment mode 7 shown in FIG. 9, the comparators 32 and 34 can be omitted. Further, when the output of the comparator 42 is simply zero, the judging circuit 35 may judge that the continuity of the testing channel exists. When the output of the comparator 42 is one, the judging circuit 35 may also judge that the continuity of the testing channel does not exist.

Embodiment Mode 8

Figure 10:
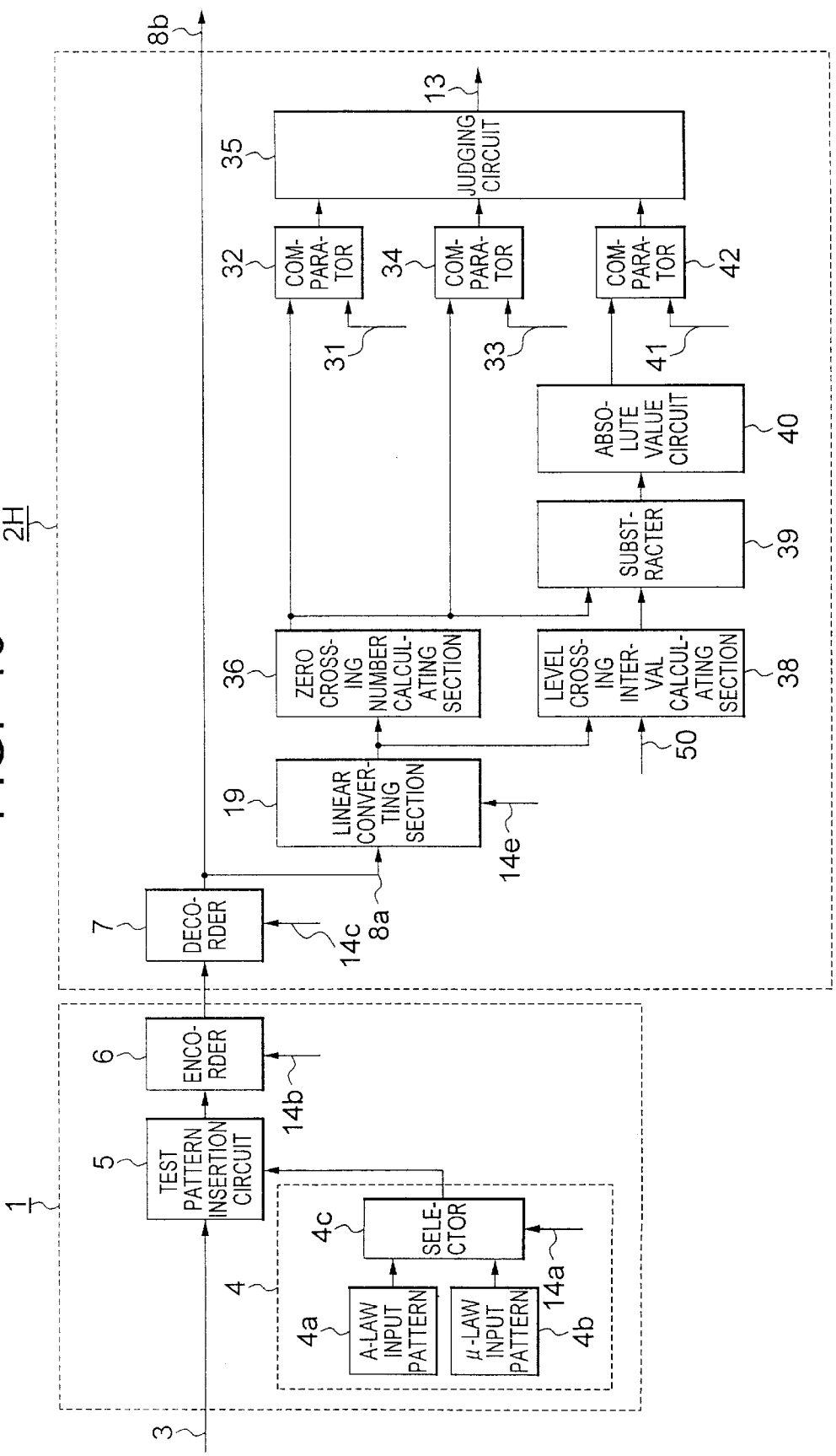
FIG. 10 is a diagram showing the structure of a channel check test system in accordance with an embodiment mode 8 of this invention.

A channel check test system in accordance with an embodiment mode 8 of this invention will be explained with reference to the drawings. FIG. 10 is a diagram showing the structure of the channel check test system in accordance with the embodiment mode 8 of this invention.

In FIG. 10, reference numerals 1, 2H and 3 respectively designate a transmitting side DCME, a receiving side DCME and an input signal nonlinear-quantized by an A-law or a μ-law and inputted to the transmitting side DCME 1. An input pattern generator 4 generates an input test pattern nonlinear-quantized by the A-law or the μ-law. An A-law input pattern data memory 4a stores input test pattern data nonlinear-quantized by the A-law. A μ-law input pattern data memory 4b stores input test pattern data nonlinear-quantized by the μ-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the μ-law and outputted from the decoder 7, and an output signal nonlinear-quantized by the A-law or the μ-law from the receiving side DCME 2H. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the μ-law to a linear quantized PCM signal. Reference numeral 31 designates a threshold value. A comparator 32 compares an output value of a zero crossing interval calculating section described later and the threshold value 31. Reference numeral 33 designates a threshold value. A comparator 34 compares the output value of the zero crossing interval calculating section described later and the threshold value 33. A judging circuit 35 judges existence or nonexistence of the continuity of a channel on the basis of output values of the comparators 32, 34 and 42.

Further, in this figure, the zero crossing interval calculating section 36 calculates a zero crossing interval with respect to an output value of the linear converting section 19. A level crossing interval calculating section 38 calculates a level crossing interval with respect to the output value of the linear converting section 19. A subtracter 39 calculates the difference between the zero crossing interval and the level crossing interval. An absolute value circuit 40 calculates an absolute value of an output value of the subtracter 39. Reference numeral 41 designates a threshold value. A comparator 42 compares an output value of the absolute value circuit 40 and the threshold value 41. Reference numeral 50 designates a threshold value.

An operation of the channel check test system in accordance with the above embodiment mode 8 will next be explained with reference to the drawings.

Operations of the input pattern generator 4, the test pattern insertion circuit 5, the encoder 6, the decoder 7 and the linear converting section 19 are equal to those in the above embodiment mode 1 and their explanations are therefore omitted here. Further, operations of the comparators 32, 34, 42, the judging circuit 35, the subtracter 39 and the absolute value circuit 40 are equal to those in the above embodiment mode 7 and their explanations are therefore omitted here.

The zero crossing interval calculating section 36 calculates a zero crossing interval with respect to an output signal of the linear converting section 19, i.e., a time interval at which the output signal of the linear converting section 19 crosses a zero level within a predetermined time.

Further, the level crossing interval calculating section 38 calculates a level crossing interval with respect to the output signal of the linear converting section 19, i.e., a time interval at which the output signal of the linear converting section 19 crosses the threshold value 50 within a predetermined time. It is necessary to select a non-zero value within the range of an amplitude of the test pattern as this threshold value 50. Further, this threshold value 50 may be a positive or negative value.

An expected value P of an output of the zero crossing interval calculating section 36 during the time when the test pattern is being inputted is a half of the time of a period T of the test pattern, namely, P=T/2 as explained in the above embodiment mode 4.

When the above threshold value 31 is set to P+ΔP and the above threshold value 33 is set to P−ΔP and the continuity of the testing channel exists, the output value of the zero crossing interval calculating section 36 is smaller than the threshold value 31 and is greater than the threshold value 33. Therefore, the output value of the comparator 32 becomes zero and the output value of the comparator 34 becomes one. Further, since the output value of the zero crossing interval calculating section 36 and an output value of the level crossing interval calculating section 38 are approximately equal to each other, the output value of the comparator 42 becomes zero. Accordingly, the judging circuit 35 judges that the continuity of the testing channel exists.

In contrast to this, when the continuity of the testing channel does not exist, the output of the zero crossing interval calculating section 36 does not take a value within the range between the threshold values 31 and 33. Therefore, the judging circuit 35 judges that the continuity of the testing channel does not exist.

When the PCM companding law is set erroneously, the output value of the zero crossing interval calculating section 36 is equal to that provided when the PCM companding law is correctly set and the continuity of the testing channel exists. However, the output value of the level crossing interval calculating section 38 is different from this output value of the zero crossing interval calculating section 36. Accordingly, since the absolute value calculated in the absolute value circuit 40 with respect to an output of the subtracter 39 is greater than the threshold value 41, the output of the comparator 42 becomes one and the judging circuit 35 judges that the continuity of the testing channel does not exist.

If the channel check test system is constructed as mentioned above, existence or nonexistence of the continuity of the channel to be tested can be simply checked, including an error in setting of the PCM companding law in one of the transmitting side DCME 1 and the receiving side DCME 2H. In the structure of the channel check test system in the above embodiment mode 8 shown in FIG. 10, the comparators 32 and 34 can be omitted. Further, when the output of the comparator 42 is simply zero, the judging circuit 35 may judge that the continuity of the testing channel exists. When the output of the comparator 42 is one, the judging circuit 35 may also judge that the continuity of the testing channel does not exist.

Embodiment Mode 9

Figure 11:
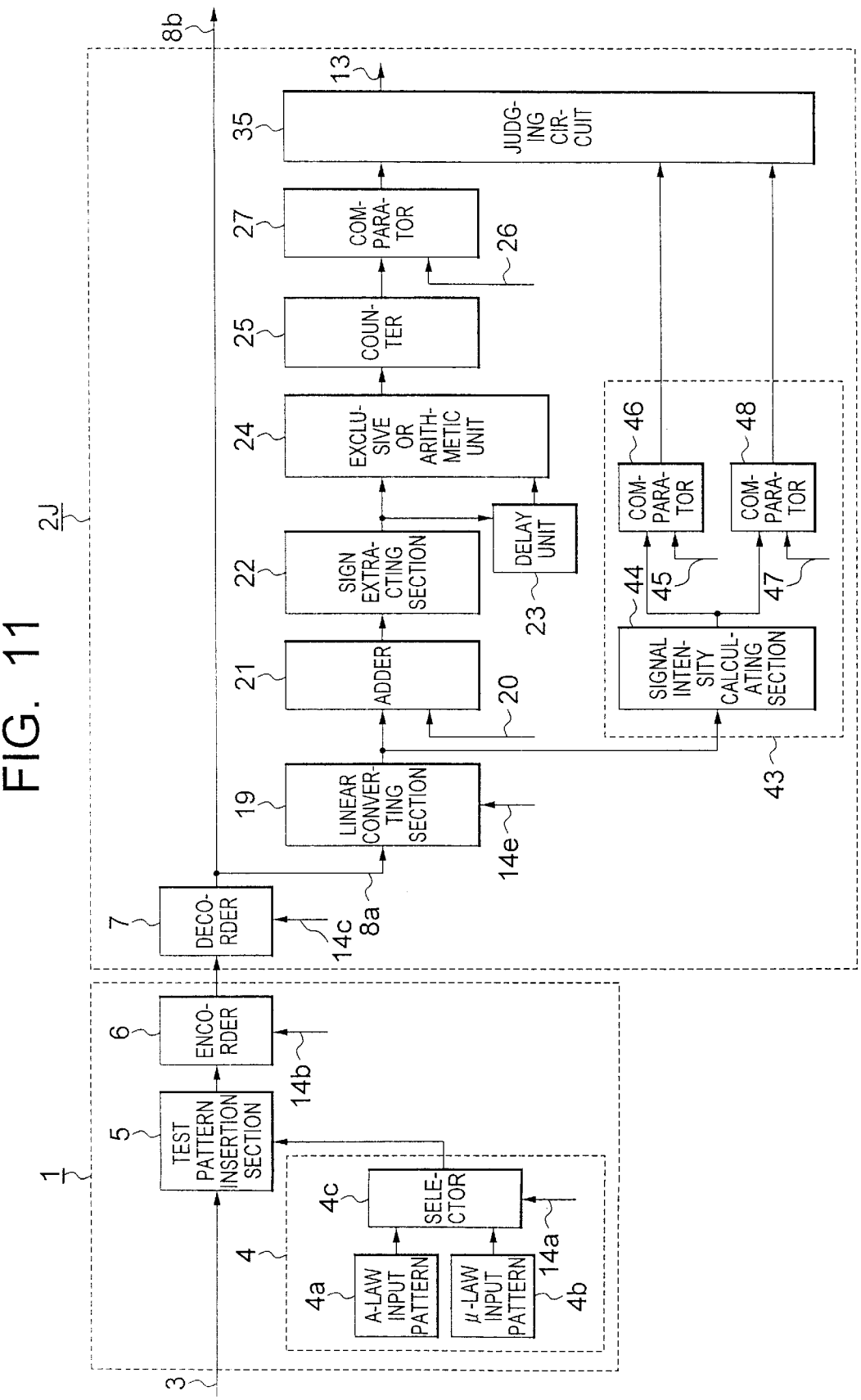
FIG. 11 is a diagram showing the structure of a channel check test system in accordance with an embodiment mode 9 of this invention.
Figure 12:
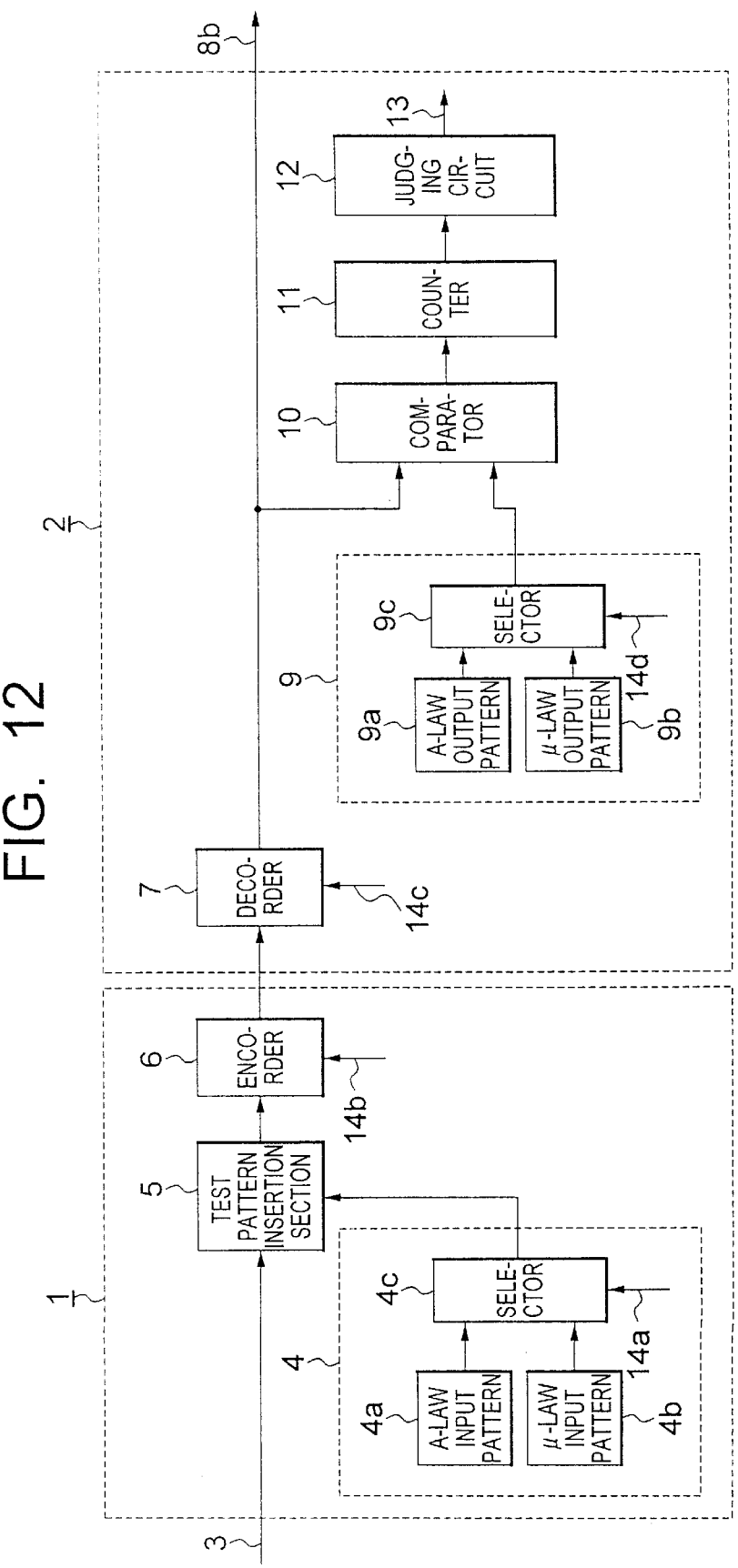
FIG. 12 is a diagram showing the structure of a conventional channel check test system.
Figure 13:
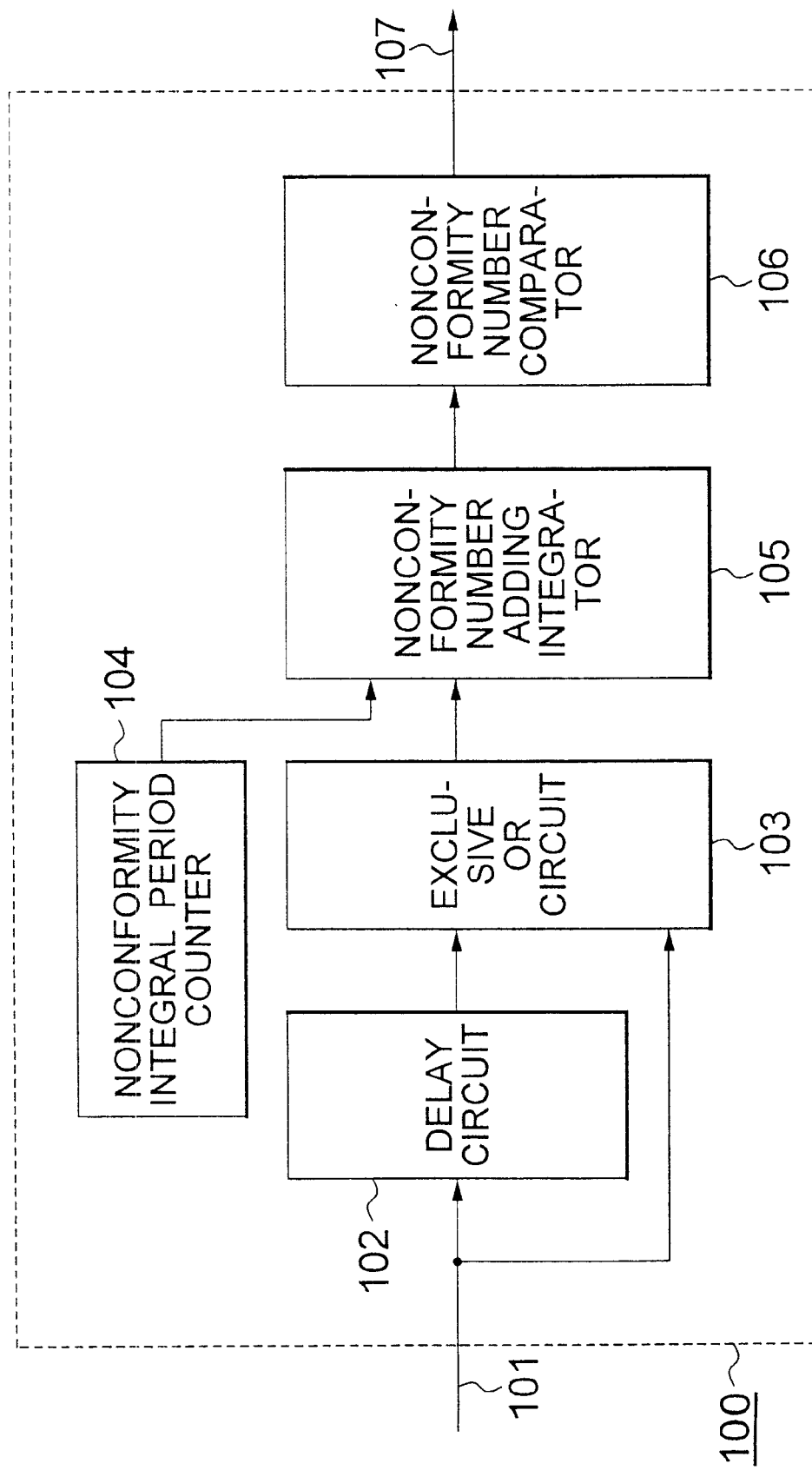
FIG. 13 is a diagram showing the structure of another conventional channel check test system.
Figure 15:
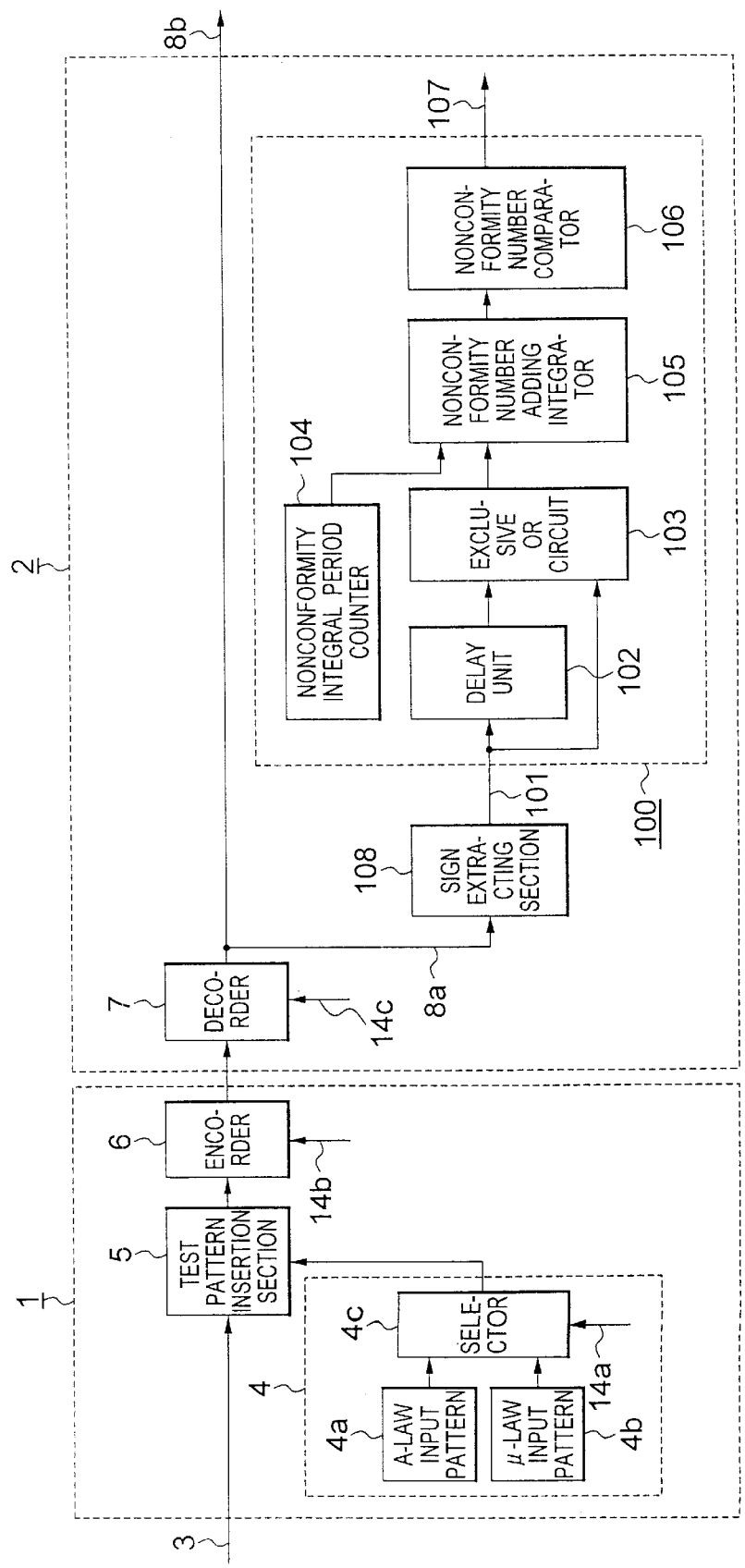
FIG. 15 is a block diagram showing an example in which another conventional channel check test system is applied to a DCME.

A channel check test system in accordance with an embodiment mode 9 of this invention will be explained with reference to the drawings. FIG. 11 is a diagram showing the structure of the channel check test system in accordance with the embodiment mode 9 of this invention.

In FIG. 11, reference numerals 1, 2J and 3 respectively designate a transmitting side DCME, a receiving side DCME and an input signal nonlinear-quantized by an A-law or a $\mu$-law and inputted to the transmitting side DCME 1. An input pattern generator 4 generates an input test pattern nonlinear-quantized by the A-law or the $\mu$-law. An A-law input pattern data memory 4a stores input test pattern data nonlinear-quantized by the A-law. A $\mu$-law input pattern data memory 4b stores input test pattern data nonlinear-quantized by the $\mu$-law. Reference numeral 4c designates a selector. A test pattern insertion circuit 5 inserts an output signal of the input pattern generator 4 into a channel to be tested. An encoder 6 encodes an output signal of the test pattern insertion circuit 5 with high efficiency.

In this figure, reference numerals 7, 8a and 8b respectively designate a decoder for decoding the encoded signal, a decoded signal nonlinear-quantized by the A-law or the $\mu$-law and outputted from the decoder 7, and an output signal nonlinear-quantized by the A-law or the $\mu$-law from the receiving side DCME 2J. Reference numeral 13 designates judged results. Reference numerals 14a, 14b, 14c, and 14e designate companding law setting signals.

Further, in this figure, a linear converting section 19 converts the decoded signal 8a nonlinear-quantized by the A-law or the $\mu$-law to a linear quantized PCM signal. Reference numeral 20 designates an offset value. An adder 21 adds the offset value 20 to an output value of the linear converting section 19. A sign extracting section 22 extracts a sign of an output signal of the adder 21. A delay unit 23 delays the sign outputted from the sign extracting section 22. An exclusive OR arithmetic unit 24 performs an exclusive OR operation of the sign outputted from the sign extracting section 22 and an output signal of the delay unit 23. A counter 25 counts the number of times of conformity in which an output of the exclusive OR arithmetic unit 24 is in conformity with a predetermined value. Reference numerals 26 and 27 respectively designate a threshold value and a comparator for comparing an output signal of the counter 25 and the threshold value 26.

Further, in this figure, a judging circuit 35 judges existence or nonexistence of the continuity of a channel on the basis of output values of comparators 27, 46 and 48. A signal intensity judging section 43 makes a judgment based on the intensity of an output signal of the linear converting section 19. A signal intensity calculating section 44 calculates the intensity of the output signal of the linear converting section 19. Reference numeral 45 designates a threshold value. A comparator 46 compares the signal intensity and the threshold value 45. Reference numeral 47 designates a threshold value. A comparator 48 compares the signal intensity and the threshold value 47.

An operation of the channel check test system in accordance with the above embodiment mode 9 will next be explained with reference to the drawings.

Operations of the input pattern generator 4, the test pattern insertion circuit 5, the encoder 6, the decoder 7, the linear converting section 19, the adder 21, the sign extracting section 22, the delay unit 23, the exclusive OR arithmetic unit 24, the counter 25 and the comparator 27 are equal to those in the above embodiment mode 1 and their explanations are therefore omitted here.

The signal intensity judging section 43 calculates signal intensity with respect to the output signal of the linear converting section 19 and performs preprocessing for judging existence or nonexistence of the continuity of a channel on the basis of this signal intensity.

The signal intensity calculating section 44 calculates the signal intensity with respect to the output signal of the linear converting section 19. For example, a concrete means of a calculating method of this signal intensity is constructed by (1) the calculation of a mean square value of an amplitude value of the output signal of the linear converting section 19 within a predetermined time, (2) the calculation of an mean absolute value of the amplitude value of the output signal of the linear converting section 19 within a predetermined time, (3) the calculation of a maximum value of the amplitude value of the output signal of the linear converting section 19 within a predetermined time, etc.

The comparator 46 compares the signal intensity outputted from the signal intensity calculating section 44 and the predetermined threshold value 45, and outputs results of this comparison. For example, when the signal intensity is greater than the threshold value 45, the comparator 46 outputs one. In contrast to this, when the signal intensity is smaller than the threshold value 45, the comparator 46 outputs zero.

The comparator 48 compares the signal intensity outputted from the signal intensity calculating section 44 and the predetermined threshold value 47, and outputs results of this comparison. For example, when the signal intensity is greater than the threshold value 47, the comparator 48 outputs one. In contrast to this, when the signal intensity is smaller than the threshold value 47, the comparator 48 outputs zero.

Here, when an expected value of the signal intensity outputted from the signal intensity calculating section 44 is set to P, the above threshold value 45 is set to P+ΔP and the above threshold value 47 is set to P−ΔP. ΔP is set to an upper limit value of the magnitude of a variation from the expected value P of the signal intensity outputted from the signal intensity calculating section 44 when the continuity of the testing channel exists.

The judging circuit 35 judges existence or nonexistence of the continuity of the channel on the basis of the respective output values of the comparators 27, 46 and 48. When the output value of the comparator 27 is one and the output value of the comparator 46 is zero and the output value of the comparator 48 is one, this judging circuit 35 judges that the continuity of the testing channel exists. In a case except for this case, the judging circuit 35 judges that the continuity of the testing channel does not exist. The judging circuit 35 then outputs results 13 of this judgment.

If the channel check test system is constructed as mentioned above, existence or nonexistence of the continuity of the channel to be tested can be precisely judged, including an error in setting of the PCM companding law in one of the transmitting side DCME 1 and the receiving side DCME 2J.

In the above explanation of the embodiment mode 9, the signal intensity judging section 43 is combined with the structure of the embodiment mode 1 shown in FIG. 1. However, similar effects are also obtained when the signal intensity judging section 43 is combined with the structure shown in each of FIGS. 4 to 10 (embodiment modes 2 to 8).

INDUSTRIAL APPLICABILITY

As explained above, a channel check test system according to this invention comprises a transmitting side DCME including an input pattern generator for generating a nonlinear quantized input test pattern; a test pattern insertion circuit for inserting an output signal of the input pattern generator into a channel to be tested; and an encoder for encoding an output signal of the test pattern insertion circuit with high efficiency; and a receiving side DCME including a decoder for decoding a received signal from the channel to be tested; a linear converting section for converting the decoded signal to a linear quantized PCM signal; an adder for adding a predetermined offset value to an output value of the linear converting section; a sign extracting section for extracting a sign from an output signal of the adder; a delay unit for delaying the extracted sign by a predetermined time; an exclusive OR arithmetic unit for performing an exclusive OR operation of the extracted sign and an output signal of the delay unit; a counter for counting the number of times of conformity in which an output value of the exclusive OR arithmetic unit is in conformity with a predetermined value; and a comparator for comparing a counted value of the counter and a predetermined threshold value and outputting judged results. Accordingly, existence or nonexistence of the continuity of the channel to be tested can be checked, including an error in setting of a PCM companding law in one of the transmitting side DCME and the receiving side DCME.

As explained above, in the channel check test system according to this invention, the receiving side DCME includes a second comparator for comparing the output value of the linear converting section and a second predetermined threshold value instead of the adder and the sign extracting section; the delay unit delays an output signal of the second comparator by a predetermined time; and the exclusive OR arithmetic unit performs the exclusive OR operation of the output signal of the second comparator and the output signal of the delay unit. Accordingly, existence or nonexistence of the continuity of the channel to be tested can be checked, including an error in setting of a PCM companding law in one of the transmitting side DCME and the receiving side DCME.

As explained above, a channel check test system according to this invention comprises a transmitting side DCME including an input pattern generator for generating a nonlinear quantized input test pattern; a test pattern insertion circuit for inserting an output signal of the input pattern generator into a channel to be tested; and an encoder for encoding an output signal of the test pattern insertion circuit with high efficiency; and a receiving side DCME including a decoder for decoding a received signal from the channel to be tested; a linear converting section for converting the decoded signal to a linear quantized PCM signal; an adder for adding a predetermined offset value to an output value of the linear converting section; a zero crossing number calculating section for calculating a zero crossing number of an output value of the adder; a first comparator for comparing a value of the zero crossing number outputted from the zero crossing number calculating section and a first predetermined threshold value and outputting first compared result; a second comparator for comparing the value of the zero crossing number outputted from the zero crossing number calculating section and a second predetermined threshold value and outputting second compared result; and a judging circuit for judging existence or nonexistence of continuity of the channel to be tested on the basis of the first and second. compared results. Accordingly, existence or nonexistence of the continuity of the channel to be tested can be checked, including an error in setting of a PCM companding law in one of the transmitting side DCME and the receiving side DCME.

As explained above, in the channel check test system according to this invention, the receiving side DCME includes a zero crossing interval calculating section for calculating a zero crossing interval of an output value of the adder instead of the zero crossing number calculating section; the first comparator compares a value of the zero crossing interval outputted from the zero crossing interval calculating section and the first predetermined threshold value, and outputs the first compared result; and the second comparator compares the value of the zero crossing interval outputted from the zero crossing interval calculating section and the second predetermined threshold value, and outputs the second compared result. Accordingly, existence or nonexistence of the continuity of the channel to be tested can be checked, including an error in setting of a PCM companding law in one of the transmitting side DCME and the receiving side DCME.

As explained above, in the channel check test system according to this invention, the receiving side DCME includes a level crossing number calculating section for calculating a level crossing number of the output value of the linear converting section instead of the adder and the zero crossing number calculating section; the first comparator compares a value of the level crossing number outputted from the level crossing number calculating section and the first predetermined threshold value, and outputs the first compared result; and the second comparator compares the value of the level crossing number outputted from the level crossing number calculating section and the second predetermined threshold value, and outputs the second compared result. Accordingly, existence or nonexistence of the continuity of the channel to be tested can be checked, including an error in setting of a PCM companding law in one of the transmitting side DCME and the receiving side DCME.

As explained above, in the channel check test system according to this invention, the receiving side DCME includes a level crossing interval calculating section for calculating a level crossing interval of the output value of the linear converting section instead of the adder and the zero crossing number calculating section; the first comparator compares a value of the level crossing interval outputted from the level crossing interval calculating section and the first predetermined threshold value, and outputs the first compared result; and the second comparator compares the value of the level crossing interval outputted from the level crossing interval calculating section and the second predetermined threshold value, and outputs the second compared result. Accordingly, existence or nonexistence of the continuity of the channel to be tested can be checked, including an error in setting of a PCM companding law in one of the transmitting side DCME and the receiving side DCME.

As explained above, a channel check test system comprises a transmitting side DCME including an input pattern generator for generating a nonlinear quantized input test pattern; a test pattern insertion circuit for inserting an output signal of the input pattern generator into a channel to be tested; and an encoder for encoding an output signal of the test pattern insertion circuit with high efficiency; and a receiving side DCME including a decoder for decoding a received signal from the channel to be tested; a linear converting section for converting the decoded signal to a linear quantized PCM signal; a zero crossing number calculating section for calculating a zero crossing number of an output value of the linear converting section; a level crossing number calculating section for calculating a level crossing number of the output value of the linear converting section; a subtracter for calculating the difference between the calculated zero crossing number and the calculated level crossing number; an absolute value circuit for calculating an absolute value of an output value of the subtracter; a comparator for comparing an output value of the absolute value circuit and a predetermined threshold value and outputting compared result; and a judging circuit for judging existence or nonexistence of continuity of the channel to be tested on the basis of the compared result. Accordingly, existence or nonexistence of the continuity of the channel to be tested can be checked, including an error in setting of a PCM companding law in one of the transmitting side DCME and the receiving side DCME.

As explained above, in the channel check test system according to this invention, the receiving side DCME includes a zero crossing interval calculating section for calculating a zero crossing interval of the output value of the linear converting section and a level crossing interval calculating section for calculating a level crossing interval of the output value of the linear converting section instead of the zero crossing number calculating section and the level crossing number calculating section; and the subtracter calculates the difference between the calculated zero crossing interval and the calculated level crossing interval. Accordingly, existence or nonexistence of the continuity of the channel to be tested can be checked, including an error in setting of a PCM companding law in one of the transmitting side DCME and the receiving side DCME.

As explained above, in the channel check test system according to this invention, the receiving side DCME further includes a signal intensity calculating section for calculating intensity of the output signal of the linear converting section; a signal intensity judging section including a fourth comparator for comparing the calculated signal intensity and a fourth predetermined threshold value and outputting fourth compared result, and a fifth comparator for comparing the calculated signal intensity and a fifth predetermined threshold value and outputting fifth compared result; and a judging circuit for judging existence or nonexistence of continuity of the channel to be tested on the basis of the all compared results. Accordingly, existence or nonexistence of the continuity of the channel to be tested can be checked, including an error in setting of a PCM companding law in one of the transmitting side DCME and the receiving side DCME.

As explained above, in the channel check test system according to this invention, the receiving side DCME further includes a signal intensity calculating section for calculating intensity of the output signal of the linear converting section; and a signal intensity judging section including a fourth comparator for comparing the calculated signal intensity and a fourth predetermined threshold value and outputting fourth compared result, and a fifth comparator for comparing the calculated signal intensity and a fifth predetermined threshold value and outputting fifth compared result; and the judging circuit judges existence or nonexistence of continuity of the channel to be tested on the basis of the all compared results. Accordingly, existence or nonexistence of the continuity of the channel to be tested can be checked, including an error in setting of a PCM companding law in one of the transmitting side DCME and the receiving side DCME.

As explained above, in the channel check test system according to this invention, the predetermined time in the delay unit is set to a multiple of the time of a half period of the input test pattern. Accordingly, existence or nonexistence of the continuity of the channel to be tested can be checked, including an error in setting of a PCM companding law in one of the transmitting side DCME and the receiving side DCME.

What is claimed is:

1. A channel check test system comprising:
   a transmitting side equipment including:
      an input pattern generator for generating a nonlinear quantized input test pattern;
      a test pattern insertion circuit for inserting an output signal of said input pattern generator into a channel to be tested; and
      an encoder for encoding an output signal of said test pattern insertion circuit with high efficiency; and
   a receiving side equipment including:
      a decoder for decoding a received signal from said channel to be tested;
      a linear converting section for converting said decoded signal to a linear quantized PCM signal;
      an adder for adding a predetermined offset value to an output value of said linear converting section;
      a sign extracting section for extracting a sign from an output signal of said adder;
      a delay unit for delaying the extracted sign by a predetermined time;
      an exclusive OR arithmetic unit for performing an exclusive OR operation of said extracted sign and an output signal of said delay unit;
      a counter for counting the number of times of conformity in which an output value of said exclusive OR arithmetic unit is in conformity with a predetermined value; and a comparator for comparing a counted value of said counter and a predetermined threshold value and outputting judged results.

2. A channel check test system according to claim 1; wherein said receiving side equipment includes a second comparator for comparing the output value of said linear converting section and a second predetermined threshold value instead of said adder and said sign extracting section;

said delay unit delays an output signal of said second comparator by a predetermined time; and said exclusive OR arithmetic unit performs the exclusive OR operation of the output signal of said second comparator and the output signal of said delay unit.

3. A channel check test system comprising:

a transmitting side equipment including:
   an input pattern generator for generating a nonlinear quantized input test pattern;
   a test pattern insertion circuit for inserting an output signal of said input pattern generator into a channel to be tested; and
   an encoder for encoding an output signal of said test pattern insertion circuit with high efficiency; and
a receiving side equipment including:
   a decoder for decoding a received signal from said channel to be tested;
   a linear converting section for converting said decoded signal to a linear quantized PCM signal;
   an adder for adding a predetermined offset value to an output value of said linear converting section;
   a zero crossing number calculating section for calculating a zero crossing number of an output value of said adder;
   a first comparator for comparing a value of the zero crossing number outputted from said zero crossing number calculating section and a first predetermined threshold value and outputting first compared result;
   a second comparator for comparing the value of the zero crossing number outputted from said zero crossing number calculating section and a second predetermined threshold value and outputting second compared result; and
   a judging circuit for judging existence or nonexistence of continuity of said channel to be tested on the basis of said first and second compared results.

4. A channel check test system according to claim 3; wherein said receiving side equipment includes a zero crossing interval calculating section for calculating a zero crossing interval of an output value of said adder instead of said zero crossing number calculating section;

said first comparator compares a value of the zero crossing interval outputted from said zero crossing interval calculating section and the first predetermined threshold value, and outputs the first compared result; and the second comparator compares the value of the zero crossing interval outputted from said zero crossing interval calculating section and the second predetermined threshold value, and outputs the second compared result.

5. A channel check test system according to claim 3; wherein said receiving side equipment includes a level crossing number calculating section for calculating a level crossing number of the output value of said linear converting section instead of said adder and said zero crossing number calculating section;

said first comparator compares a value of the level crossing number outputted from said level crossing number calculating section and the first predetermined threshold value, and outputs the first compared result; and said second comparator compares the value of the level crossing number outputted from said level crossing number calculating section and the second predetermined threshold value, and outputs the second compared result.

6. A channel check test system according to claim 3; wherein said receiving side equipment includes a level crossing interval calculating section for calculating a level crossing interval of the output value of said linear converting section instead of said adder and said zero crossing number calculating section;

said first comparator compares a value of the level crossing interval outputted from said level crossing interval calculating section and the first predetermined threshold value, and outputs the first compared result; and said second comparator compares the value of the level crossing interval outputted from said level crossing interval calculating section and the second predetermined threshold value, and outputs the second compared result.

7. A channel check test system comprising:

a transmitting side equipment including:
   an input pattern generator for generating a nonlinear quantized input test pattern;
   a test pattern insertion circuit for inserting an output signal of said input pattern generator into a channel to be tested; and
   an encoder for encoding an output signal of said test pattern insertion circuit with high efficiency; and
a receiving side equipment including:
   a decoder for decoding a received signal from said channel to be tested;
   a linear converting section for converting said decoded signal to a linear quantized PCM signal;
   a zero crossing number calculating section for calculating a zero crossing number of an output value of said linear converting section;
   a level crossing number calculating section for calculating a level crossing number of the output value of said linear converting section;
   a subtracter for calculating the difference between said calculated zero crossing number and said calculated level crossing number;
   an absolute value circuit for calculating an absolute value of an output value of said subtracter;
   a comparator for comparing an output value of said absolute value circuit and a third predetermined threshold value and outputting compared result; and
   a judging circuit for judging existence or nonexistence of continuity of said channel to be tested on the basis of said compared result.

8. A channel check test system according to claim 7; wherein said receiving side equipment includes a zero crossing interval calculating section for calculating a zero crossing interval of the output value of said linear converting section and a level crossing interval calculating section for calculating a level crossing interval of the output value of said linear converting section instead of said zero crossing number calculating section and said level crossing number calculating section; and said subtracter calculates the difference between said calculated zero crossing interval and said calculated level crossing interval.

9. A channel check test system according to claim 1; wherein said receiving side equipment further includes:
   a signal intensity judging section including:
      a signal intensity calculating section for calculating intensity of the output signal of said linear converting section;
      a fourth comparator for comparing said calculated signal intensity and a fourth predetermined threshold value and outputting fourth compared result, and
      a fifth comparator for comparing said calculated signal intensity and a fifth predetermined threshold value and outputting fifth compared result; and
      a judging circuit for judging existence or nonexistence of continuity of said channel to be tested on the basis of said all compared results.

10. A channel check test system according to claim 3; wherein said receiving side equipment further includes:
    a signal intensity judging section including:
       a signal intensity calculating section for calculating intensity of the output signal of said linear converting section;
       a fourth comparator for comparing said calculated signal intensity and a fourth predetermined threshold value and outputting fourth compared result, and
       a fifth comparator for comparing said calculated signal intensity and a fifth predetermined threshold value and outputting fifth compared result; and
       said judging circuit judges existence or nonexistence of continuity of said channel to be tested on the basis of said all compared results.

11. A channel check test system according to claim 1; wherein the predetermined time in said delay unit is set to a multiple of the time of a half period of said input test pattern.

12. A channel check test system according to claim 2; wherein said receiving side equipment further includes:
    a signal intensity judging section including:
       a signal intensity calculating section for calculating intensity of the output signal of said linear converting section;
       a fourth comparator for comparing said calculated signal intensity and a fourth predetermined threshold value and outputting fourth compared result, and
       a fifth comparator for comparing said calculated signal intensity and a fifth predetermined threshold value and outputting fifth compared result; and
       a judging circuit for judging existence or nonexistence of continuity of said channel to be tested on the basis of said all compared results.

13. A channel check test system according to claim 4; wherein said receiving side equipment further includes:
    a signal intensity judging section including:
       a signal intensity calculating section for calculating intensity of the output signal of said linear converting section;
       a fourth comparator for comparing said calculated signal intensity and a fourth predetermined threshold value and outputting fourth compared result, and
       a fifth comparator for comparing said calculated signal intensity and a fifth predetermined threshold value and outputting fifth compared result; and
       said judging circuit judges existence or nonexistence of continuity of said channel to be tested on the basis of said all compared results.

14. A channel check test system according to claim 5; wherein said receiving side equipment further includes:
    a signal intensity judging section including:
       a signal intensity calculating section for calculating intensity of the output signal of said linear converting section;
       a fourth comparator for comparing said calculated signal intensity and a fourth predetermined threshold value and outputting fourth compared result, and
       a fifth comparator for comparing said calculated signal intensity and a fifth predetermined threshold value and outputting fifth compared result; and
       said judging circuit judges existence or nonexistence of continuity of said channel to be tested on the basis of said all compared results.

15. A channel check test system according to claim 6; wherein said receiving side equipment further includes:
    a signal intensity judging section including:
       a signal intensity calculating section for calculating intensity of the output signal of said linear converting section;
       a fourth comparator for comparing said calculated signal intensity and a fourth predetermined threshold value and outputting fourth compared result, and
       a fifth comparator for comparing said calculated signal intensity and a fifth predetermined threshold value and outputting fifth compared result; and
       said judging circuit judges existence or nonexistence of continuity of said channel to be tested on the basis of said all compared results.

16. A channel check test system according to claim 7; wherein said receiving side equipment further includes:
    a signal intensity judging section including:
       a signal intensity calculating section for calculating intensity of the output signal of said linear converting section;
       a fourth comparator for comparing said calculated signal intensity and a fourth predetermined threshold value and outputting fourth compared result, and
       a fifth comparator for comparing said calculated signal intensity and a fifth predetermined threshold value and outputting fifth compared result; and
       said judging circuit judges existence or nonexistence of continuity of said channel to be tested on the basis of said all compared results.

17. A channel check test system according to claim 8; wherein said receiving side equipment further includes:
    a signal intensity judging section including:
       a signal intensity calculation section for calculating intensity of the output signal of said linear converting section;
       a fourth comparator for comparing said calculated signal intensity and a fourth predetermined threshold value and outputting fourth compared result, and
       a fifth comparator for comparing said calculated signal intensity and a fifth predetermined threshold value and outputting fifth compared result; and
       said judging circuit judges existence or nonexistence of continuity of said channel to be tested on the basis of said all compared results.

18. A channel check test system according to claim 2; wherein the predetermined time in said delay unit is set to a multiple of the time of a half period of said input test pattern.

* * * * *

UNITED STATES PATENT AND TRADEMARK OFFICE
CERTIFICATE OF CORRECTION

PATENT NO.   : 6,498,833 B2
DATED        : December 24, 2002
INVENTOR(S)  : Yukimasa Sugino et al.

It is certified that error appears in the above-identified patent and that said Letters Patent is hereby corrected as shown below:

<u>Title page,</u>
Item [*] Notice, add the following pertinent information:

-- This Patent is subject to a terminal disclaimer in relation to U.S. Patent No. 6,324,260. --

Signed and Sealed this

Fourteenth Day of October, 2003

JAMES E. ROGAN
*Director of the United States Patent and Trademark Office*